United States Patent
Yifrach

(10) Patent No.: US 8,616,144 B2
(45) Date of Patent: Dec. 31, 2013

(54) SYSTEM, A METHOD AND A COMPUTER PROGRAM PRODUCT FOR REDUCING DAMAGE BY BIRDS TO AN AIRPLANE

(75) Inventor: Aharon Yifrach, Ashkelon (IL)

(73) Assignee: Israel Aerospace Industries Ltd., Lod (IL)

( * ) Notice: Subject to any disclaimer, the term of this patent is extended or adjusted under 35 U.S.C. 154(b) by 281 days.

(21) Appl. No.: 13/173,822

(22) Filed: Jun. 30, 2011

(65) Prior Publication Data

US 2012/0222611 A1    Sep. 6, 2012

(30) Foreign Application Priority Data

Mar. 2, 2011 (IL) .......................... 211512

(51) Int. Cl.
*A01M 29/32* (2011.01)
*A01M 29/00* (2011.01)

(52) U.S. Cl.
USPC ..................... 116/22 A; 340/573.2

(58) Field of Classification Search
USPC ........................ 116/22 A; 119/712, 719, 720; 340/573.2; 701/301
See application file for complete search history.

(56) References Cited

U.S. PATENT DOCUMENTS

| | | | |
|---|---|---|---|
| 4,736,907 A * | 4/1988 | Steffen | 244/1 R |
| 4,964,331 A * | 10/1990 | Halevy et al. | 89/37.19 |
| 5,009,192 A * | 4/1991 | Burman | 119/720 |
| 5,018,317 A | 5/1991 | Kiyoshige et al. | |
| 5,774,088 A * | 6/1998 | Kreithen | 342/22 |
| 5,839,927 A | 11/1998 | Thomas et al. | |
| 6,407,670 B1 * | 6/2002 | Dysarsz et al. | 340/573.2 |
| 6,533,640 B1 | 3/2003 | Nopwaskey et al. | |
| 6,940,424 B2 * | 9/2005 | Philiben et al. | 340/945 |
| 6,955,107 B2 | 10/2005 | Alitalo et al. | |
| 7,008,305 B2 | 3/2006 | Sekiya | |
| 7,047,857 B2 | 5/2006 | Adkins | |
| 7,106,216 B1 * | 9/2006 | Maher | 340/961 |
| 7,121,918 B2 | 10/2006 | Marti et al. | |
| 7,274,324 B2 * | 9/2007 | Millikin et al. | 342/146 |
| 8,164,462 B1 * | 4/2012 | Bose et al. | 340/573.1 |
| 8,431,144 B2 * | 4/2013 | Wilkins | 424/407 |
| 2010/0096471 A1 * | 4/2010 | Djordjic | 239/67 |
| 2011/0144829 A1 * | 6/2011 | Kim et al. | 701/2 |

FOREIGN PATENT DOCUMENTS

DE    10230399 A1 *    1/2004    ............ A01M 29/16

* cited by examiner

*Primary Examiner* — R. A. Smith
(74) *Attorney, Agent, or Firm* — Oliff & Berridge, PLC

(57) ABSTRACT

A system for reducing damage by birds to an airplane, the system including: (a) a detector mounted on the airplane, operable to detect a bird in a vicinity of the airplane and to generate detection information indicative of motion of the bird; (b) a processor, connected to the detector, configured to analyze the detection information and to selectively trigger activation of a jetting system that is mounted on the airplane in response to a result of the analysis; and (c) the jetting system, operable to jet a high pressure jet onto a bird.

38 Claims, 13 Drawing Sheets

510 activating one or more systems operable to reducing damage to an airplane by birds 511 arming one or more systems operable to reducing damage to an airplane by birds 512 testing an operational state of one or more systems operable to reducing damage to an airplane by birds 513 gaining control of airplane resources of one or more other systems of the airplane 514 selectively preventing triggering of the activation of the jetting system in response to received location information that is indicative of a location of the airplane

FIG. 5B

590 jetting the high pressure jet onto the bird 591 jetting onto the bird the high pressure jet that includes water from at least one jetting system container of water 592 jetting onto the bird the high pressure jet that includes water from at least one jetting system container of water that is connected to a corresponding high pressure tank that contains high pressured gas 593 blocking any gas transmission permitting connecting between each of the at least one jetting system container and its corresponding high pressure tank during the first period 594 selectively opening any of the at least one gas transmission permitting connecting in response to a command 595 blocking any hydraulically connecting between each of the at least one jetting system container and a fresh water supply of the airplane prior to the jetting of the high pressure jet and during the jetting 596 administering polymeric material, which is characterized by its usability for modifying surface tension of water, into jetting system container water

FIG. 5C

SYSTEM, A METHOD AND A COMPUTER PROGRAM PRODUCT FOR REDUCING DAMAGE BY BIRDS TO AN AIRPLANE

RELATED APPLICATIONS

This application claims priority from Israeli patent application serial number 211,512 filing date Mar. 2, 2011, which is incorporated herein by its entirety.

FIELD OF THE INVENTION

This invention relates to improving aviation safety, and especially to reducing of damage by birds to airplanes.

BACKGROUND OF THE INVENTION

Man made airplanes have entered an already inhabited environment, and have to share the aerial medium with various kinds of birds. Encounters between airplanes and birds are not at all uncommon and infect reported bird strike go as far back as a 1905 flight of aviation pioneer Orville Wright. The first casualty did not take long to follow, and a bird strike of aero-pioneer Cal with a gull at 1912 resulted in the crashing of the airplane.

Given the ever increasing number of airplanes at the sky, bird strikes are becoming more of a problem every year. Nowadays, dozens of airplanes suffer bird strikes annually, of which many suffer from physical damage to the airplane while some of these accidents even result in fatal encounters.

On Oct. 4, 1960, Eastern Air Lines Flight 375 flying from Boston encountered a flock of common starlings during takeoff. This incident resulted in damage to all four engines and consequentially to a crashing of the plane shortly thereafter into Boston harbor. Of 72 passengers, 62 people lost their life in this incident.

Annual cost of this problem in the U.S. only is estimated at $400 million and even more. All the more so, bird strikes resulted in hundreds of worldwide deaths. While bird strikes happen most often at low altitudes, and especially during takeoff or landing (or during low altitude flight), the problem is not limited to low altitudes only, and bird strikes occurred at much higher altitudes, even higher than 30,000 feet. It should be noted that bird strikes at low altitudes may not give a pilot sufficient time to recover from the event, and thus crashes are even more likely.

While birds may strike airplanes in various ways, due to the velocity of the airplane which is much higher than that of the birds, birds usually impact airplanes at forward-facing faces of the airplane, such as cone, wing front edges, and most problematically jet engine cowling or inlets. Collisions of birds into engines of airplanes are extremely dangerous, because of the sensitivity of the engines, due to their design, to any significant impact. The fast rotation of the blades only increases that problem. Even more hazardous than encounters with individual birds are strikes by flocks of birds.

Conventional art counter measures are of the following types of solution—design of airplanes or parts thereof to be resistant to bird strikes (e.g. engines of large commercial jet are usually designed to securely shut themselves down after being hit by a bird, and while not designed to operated thereafter, residual damage which may result from displacement of blades for example, is restricted), removal of airplanes from the way of birds (e.g. by education of pilots, by restricting takeoffs and landing in view of birds migration patterns, etc.), and moving birds away of airports and airplanes (e.g. using scaring devices like sounds, lights, decoys, etc.).

It should be noted that conventional art physical solutions have usually been designed to withstand an impact of a single collision with a 1.8 kg bird. It should be noted that the number of passengers and cargo airplanes in the U.S. only well exceeds 6,500, and over 20,000 of them are active worldwide.

There is therefore a great need for effective solutions of reducing damage of birds to airplanes.

High pressure water jets are used in the prior art for cutting and processing machinery. The following documents discuss some examples of prior art use of high pressure jets for cutting and/or processing destination objects in a predetermined manner.

U.S. Pat. No. 6,533,640 discloses an ultra high pressure abrasive waterjet cutting apparatus for cutting nuclear reactor structural components. The cutting apparatus includes an ultra high pressure abrasive waterjet (UHP) cutting nozzle, movably connected to a single axis manipulator, and a collection hood. The manipulator and the collection hood are connected to a support frame and are configured to be positioned inside adjacent apertures of a nuclear reactor top guide or core plate so that the cutting nozzle is in alignment with the collection hood. The manipulator includes a linear frame, a nozzle support plate movably connected to the linear frame, and a motor operatively connected to the nozzle support plate. The collection hood includes an elongate collection chamber having an elongate aperture located so that the aperture is in alignment with the cutting nozzle. The collection hood also includes at least one positioning cylinder connected to the collection chamber and to the support frame which positions the collection chamber aperture adjacent a top guide or core plate beam. The collection hood further includes an outlet port configured to be connected to a water filtration system.

U.S. Pat. No. 7,121,918 discloses a machine tool for processing workpieces using a high-pressure water jet, the workpiece to be processed being mounted on a grate-like or grid-like support over or in a water basin, which is cuboid at least in the upper region, and has at least one water jet exiting from at least one nozzle applied to it, this nozzle being numerically controlled in its position at least in a horizontal plane (X, Y) and the distance between the workpiece and the nozzle being kept at least approximately constant or controlled in the vertical direction (Z) and an equalization container being provided in the region of the water basin, via which the level in the water basin is set, characterized in that at least one side wall on the water basin is designed as partially raisable or foldable and sliding elements, which allow a frame, having workpieces positioned on its workpiece supports, to be moved in and out, are positioned on at least the fixed side walls adjoining this side wall.

U.S. Pat. No. 7,047,857 discloses a machine for cutting the border of a workpiece using one or more water jet cutting tools separately carried by one or more monorail track mounted carriage assemblies. The machine can also include an aperture forming apparatus for forming circular apertures and/or elongated slots in the workpiece prior to/or simultaneously with the border trimming operation, all while the workpiece occupies a single work station in the machine. In one embodiment, the aperture forming apparatus features a cutting tool mounted on an elongate arm affixed to and extending from a plate which is fixedly oriented in a horizontal plane. While so oriented, a motor and gear assembly causes the plate to wobble in a circular pattern in the plane to, in turn, cause the tool to make a circular cut in the workpiece. In another embodiment of the apparatus, a motor rotates a cam carried on a free end of a stationary arm, the cam containing an eccentrically mounted cutting tool.

U.S. Pat. No. 7,008,305 discloses a water jet-processing machine comprising a workpiece holding table for holding a workpiece, a nozzle for applying processing water to the workpiece held on the workpiece holding table, and a processing water supply means for supplying processing water containing abrasive grains to the nozzles, wherein the water jet-processing machine comprises a plurality of the nozzles and an interval adjusting means for adjusting an interval between adjacent nozzles.

U.S. Pat. No. 6,955,107 discloses equipment for cutting particularly a paper web with a water jet. Discussed are support and positioning means and a cutting head supported on them extend in the operating position of the area of the edge part of a paper web. In the cutting head, there is a support surface and at least one nozzle, which is set in such a way that the edge part travels between the support surface and the nozzle. The equipment includes mechanical cleaning means and/or a cleaning construction for keeping the support surfaces clean. The cleaning means and/or cleaning construction are arranged on the opposite side of the paper web to the nozzle.

U.S. Pat. No. 5,839,927 discloses a water jet system that uses cantilever bars for an inlet grating, to prevent blockage. The water jet system also uses an elliptical impeller shaft housing to reduce turbulence and snagging of debris by the rotating impeller shaft. The water jet system uses impeller blades with a curved cross section that curves towards the direction of forward rotation. The water jet system uses U-shaped flanges mounted to the outlet of the water jet to provide steering.

U.S. Pat. No. 5,018,317 discloses an abrasive water jet cutting apparatus. In an apparatus for cutting a work by an abrasive water jet containing abrasive particles, an abrasive suspension such that abrasive particles with an average size of up to about 1100 microns are held in suspension in water is supplied to a jet nozzle assembly in which the abrasive suspension is induced by a high pressure ejected water and directed against the work. The ejected water is passed through an ejected water passageway to which is connected an abrasive water orifice of an abrasive water nozzle tip. The abrasive water orifice has an upstream tapered portion the diameter of which gradually increases toward an upstream aperture at which the abrasive water orifice is connected smoothly to the downstream end of the ejected water passageway, whereby the flow of ejected water is streamlined. The abrasive suspension is supplied to, and merges with, the streamlined flow of the ejected water near the junction of the ejected water passageway and the abrasive water orifice, as an outer layer of the streamlined flow, whereby a dual-layer streamlined jet is obtained which enables fine cutting and also reduces wear of the nozzle tip.

SUMMARY OF THE INVENTION

A system for reducing damage by birds to an airplane is disclosed, the system including: (a) a detector mounted on the airplane, operable to detect a bird in a vicinity of the airplane and to generate detection information indicative of motion of the bird; (b) a processor, connected to the detector, configured to analyze the detection information and to selectively trigger activation of a jetting system that is mounted on the airplane in response to a result of the analysis; and (c) the jetting system, operable to jet a high pressure jet onto a bird.

According to an embodiment of the invention, the detector may be an optical detector, operable to detect the bird by detection of light reflected from the bird. According to an embodiment of the invention, the detector may be a light detection and ranging (LIDAR) detector, operable to emit laser pulses and to detect the bird by detection of light reflected from the bird.

According to an embodiment of the invention, the processor may be further configured to analyze the detection information to determine an assessed potential of damage by the bird to an engine of the airplane, and to selectively trigger the activation of the jetting system in response to a result of the analysis.

According to an embodiment of the invention, a distance between a wing of the airplane and a nozzle of the jetting system used for the jetting of the high pressure jet is shorter than a distance of the nozzle from a frontmost part of a nose of the airplane and than a distance of the nozzle from a rearmost part of the airplane.

According to an embodiment of the invention, a distance between a frontmost part of a nose of the airplane and a nozzle of the jetting system used for the jetting of the high pressure jet is shorter than 5% of a length of the airplane which is measured between the frontmost part of the nose of the airplane and a rearmost part of the airplane.

According to an embodiment of the invention, the jetting system includes at least one jetting system container of water, wherein the jetting system is operable to jet onto the bird the high pressure jet that includes water from the at least one jetting system container.

According to an embodiment of the invention, at least one component of the jetting system may be operable to administer polymeric material, which is characterized by its usability for modifying surface tension of water, into jetting system container water before jetting the high pressure jet that includes the water from the at least one jetting system container.

According to an embodiment of the invention, the at least one jetting system container of water may be hydraulically connected to a fresh water supply of the airplane for at least a first period between a takeoff of the airplane to the triggering of the jetting system, wherein a difference between water pressure in any of the at least one jetting system container and water pressure of the fresh water supply is less than 5% at times of such a hydraulic connection.

According to an embodiment of the invention, each of the at least one jetting system container may be connected to a corresponding high pressure tank that contains high pressured gas at a pressure that exceeds 1,000 pounds per square inch (PSI), wherein any gas transmission permitting connection between each of the at least one jetting system container and its corresponding high pressure tank may be blocked during the first period and may be selectively opened in response to a command issued by the processor.

According to an embodiment of the invention, any hydraulically connection between each of the at least one jetting system container and a fresh water supply of the airplane may be blocked prior to the jetting of the high pressure jet and during the jetting.

According to an embodiment of the invention, the jetting system may be operable to concurrently jet from multiple nozzles of the jetting system multiple high pressure jets, of which at least one jet is jetted onto the bird.

According to an embodiment of the invention, an angle between a jetting direction in which the jetting system may be operable to jet the high pressure jet and a progression direction of the airplane does not exceed 5°.

According to an embodiment of the invention, an angle between a jetting direction in which the jetting system is operable to jet the high pressure jet and a progression direction of the airplane may be between 80° and 100°.

According to an embodiment of the invention, the processor may be further configured to determine a desired jetting direction in response to the result of the analysis, wherein a configuration of at least one nozzle is modified prior to the jetting of the high pressure jet in response to the desired jetting direction.

According to an embodiment of the invention, the processor may be further configured to issue, following the analysis, an alert to an external airplane system indicating that a jetting by the jetting system occurred.

According to an embodiment of the invention, the processor may be further configured to receive location information indicative of a location of the airplane and to selectively prevent triggering of the activation of the jetting system in response to the location information.

According to an embodiment of the invention, the processor may be further configured to receive from an external system of the airplane environmental-condition indicative data that is indicative of at least one physical condition in an environment of the airplane, and to determine activation parameters for the jetting system in response to the environmental-condition indicative data.

According to an embodiment of the invention, the processor may be further configured to determine activation parameters for multiple jetting instances of the jetting system.

According to an embodiment of the invention, the processor may be further configured to determine the activation parameters for the multiple jetting instances in response to detection information that is received from the detector and which is indicative of detection of multiple birds at least partly concurrently.

According to an embodiment of the invention, the processor may be configured to autonomously trigger the activation of the jetting system without receiving commands from any external system.

A method for reducing damage to an airplane by birds is disclosed, the method including: selectively triggering jetting of a high pressure jet onto the bird by a jetting system that is mounted on the airplane. According to an embodiment of the invention, the method further includes receiving detection information which is indicative of motion of a bird detected in a vicinity of the airplane; and analyzing the detection information; wherein the selective triggering comprises selectively triggering the jetting of the high pressure jet onto the bird in response to a result of the analysis.

According to an embodiment of the invention, the detecting includes detecting the bird by a detector that is a light detection and ranging (LIDAR) detector, which is operable to emit laser pulses and to detect the bird by detection of light reflected from the bird.

According to an embodiment of the invention, the analyzing further includes analyzing the detection information to determine an assessed potential of damage by the bird to an engine of the airplane.

According to an embodiment of the invention, the method may further include jetting of the high pressure jet onto the bird from at least one nozzle that is located so that a distance between a wing of the airplane and the nozzle is shorter than a distance of the nozzle from a frontmost part of a nose of the airplane and than a distance of the nozzle from a rearmost part of the airplane.

According to an embodiment of the invention, the method may further include jetting of the high pressure jet onto the bird from at least one nozzle that is located so that a distance between a frontmost part of a nose of the airplane and the nozzle is shorter than 5% of a length of the airplane which is measured between the frontmost part of the nose of the airplane and a rearmost part of the airplane.

According to an embodiment of the invention, the method may further include jetting onto the bird the high pressure jet that includes water from at least one jetting system container of water, and administering polymeric material, which is characterized by its usability for modifying surface tension of water, into jetting system container water prior to the jetting of the high pressure jet.

According to an embodiment of the invention, the method may further include jetting onto the bird the high pressure jet that includes water from at least one jetting system container of water that is hydraulically connected to a fresh water supply of the airplane for at least a first period between a takeoff of the airplane to the triggering of the jetting system, wherein a difference between water pressure in any of the at least one jetting system container and water pressure of the fresh water supply is less than 5% at times of such a hydraulic connection.

According to an embodiment of the invention, the method may further include jetting onto the bird the high pressure jet that includes water from at least one jetting system container of water that is connected to a corresponding high pressure tank that contains high pressured gas at a pressure that exceeds 1,000 pounds per square inch (PSI); blocking any gas transmission permitting connection between each of the at least one jetting system container and its corresponding high pressure tank during the first period; and selectively aperture any of the at least one gas transmission permitting connection in response to a command issued by the processor.

According to an embodiment of the invention, the method may further including blocking any hydraulically connection between each of the at least one jetting system container and a fresh water supply of the airplane prior to the jetting of the high pressure jet and during the jetting.

According to an embodiment of the invention, the method may further include concurrently jetting from multiple nozzles of the jetting system multiple high pressure jets, of which at least one jet is jetted onto the bird.

According to an embodiment of the invention, the method may further include jetting onto the bird the high pressure jet in a jetting direction so that an angle between the jetting direction and a progression direction of the airplane does not exceed 5°.

According to an embodiment of the invention, the method may further include jetting onto the bird the high pressure jet in a jetting direction so that an angle between the jetting direction and a progression direction of the airplane is between 80° and 100°.

According to an embodiment of the invention, the method may further include determining a desired jetting direction in response to the result of the analysis, and modifying a configuration of at least one nozzle prior to the jetting of the high pressure jet in response to the desired jetting direction.

According to an embodiment of the invention, the method may further include jetting the high pressure jet to an effective distance of at least 3.5 meters from at least one nozzle out of which the high pressure jet is jetted, wherein at any distance smaller than the effective distance, water velocity in a core of the high pressure jet is higher than 50 meters per second.

According to an embodiment of the invention, the method may further include jetting the high pressure jet that consumes between 30 and 150 liters of jetted liquid.

According to an embodiment of the invention, the method may further include jetting of at least one high pressure jet so that any high pressure jet that is jetted by the jetting system during a single flight of the airplane is jetted for an effective duration of less than 20 milliseconds, wherein the effective duration of a jetting is a time in which water velocity in a core of the high pressure jet exceeds 50% of the highest water velocity in the core of that jetting.

According to an embodiment of the invention, the method may further include jetting the high pressure jet wherein an aperture size of any nozzle that is used by the jetting system for the jetting of the high pressure jet is smaller than 4 millimeters.

According to an embodiment of the invention, the method may further include issuing an alert to an external airplane system indicating that a jetting by the jetting system occurred, wherein the issuing is carried out after the analyzing.

According to an embodiment of the invention, the method may further include selectively preventing triggering of the activation of the jetting system in response to received location information that is indicative of a location of the airplane.

According to an embodiment of the invention, the method may further include determining activation parameters for the jetting system in response to environmental-condition indicative data that is indicative of at least one physical condition in an environment of the airplane.

According to an embodiment of the invention, the method may further include determining activation parameters for multiple jetting instances of the jetting system.

According to an embodiment of the invention, the method may further include determining the activation parameters for the multiple jetting instances in response to detection information that is received from the detector and which is indicative of detection of multiple birds at least partly concurrently.

According to an embodiment of the invention, the selective triggering includes autonomously triggering the activation of the jetting system without receiving commands from any external system.

Another method for reducing damage to an airplane by birds is also disclosed, the other method including: (a) receiving detection information which is indicative of motion of a bird detected in a vicinity of the airplane; (b) analyzing the detection information; and (c) selectively triggering jetting of a high pressure jet onto the bird by a jetting system that is mounted on the airplane, in response to a result of the analysis According to an embodiment of the invention, in the other method the receiving may include receiving the detection information that was generated by a detector mounted on the airplane.

According to an embodiment of the invention, in the other method the receiving may include receiving the detection information that was generated by the detector that is a light detection and ranging (LIDAR) detector that is operable to emit laser pulses and to detect the bird by detection of light reflected from the bird.

According to an embodiment of the invention, in the other method the analyzing may further include analyzing the detection information to determine an assessed potential of damage by the bird to an engine of the airplane.

According to an embodiment of the invention, the other method may further include issuing a command for modifying a state of a hydraulic connection between a fresh water supply of the airplane and at least one jetting system container of water that contains water used for the jetting onto the bird of the high pressure jet and which is hydraulically connected to the fresh water supply of the airplane for at least a first period between a takeoff of the airplane to the triggering of the jetting system.

According to an embodiment of the invention, the other method may further include selectively issuing a command to open any of at least one gas transmission permitting connection between at least one jetting system container that contains water used for the jetting onto the bird of the high pressure jet and its corresponding high pressure tank.

According to an embodiment of the invention, the other method may further include determining a desired jetting direction in response to the result of the analysis, and issuing a modification command instructing a jetting system component to modify a configuration of at least one nozzle prior to the jetting of the high pressure jet in response to the desired jetting direction.

According to an embodiment of the invention, the other method may further include issuing an alert to an external airplane system indicating that a jetting by the jetting system occurred, wherein the issuing is carried out after the analyzing.

According to an embodiment of the invention, the other method may further include selectively preventing triggering of the activation of the jetting system in response to received location information that is indicative of a location of the airplane.

According to an embodiment of the invention, the other method may further include determining activation parameters for the jetting system in response to environmental-condition indicative data that is indicative of at least one physical condition in an environment of the airplane.

According to an embodiment of the invention, the other method may further include determining activation parameters for multiple jetting instances of the jetting system.

According to an embodiment of the invention, the other method may further include determining the activation parameters for the multiple jetting instances in response to detection information that is received from the detector and which is indicative of detection of multiple birds at least partly concurrently.

According to an embodiment of the invention, in the other method the selective triggering includes autonomously triggering the activation of the jetting system without receiving commands from any external system.

A program storage device readable by machine is disclosed, the program storage device tangibly embodying a program of instructions executable by the machine to perform method for reducing damage to an airplane by birds including the steps of: (a) receiving detection information that was generated by a detector mounted on the airplane and which is indicative of motion of a bird detected by the detector in a vicinity of the airplane; (b) analyzing the detection information; and (c) selectively triggering jetting of a high pressure jet onto the bird by a jetting system that is mounted on the airplane, in response to a result of the analysis According to an embodiment of the invention, the receiving includes receiving the detection information that was generated by the detector that is a light detection and ranging (LIDAR) detector that is operable to emit laser pulses and to detect the bird by detection of light reflected from the bird.

According to an embodiment of the invention, the analyzing further includes analyzing the detection information to determine an assessed potential of damage by the bird to an engine of the airplane.

According to an embodiment of the invention, the program storage device further includes issuing a command for modifying a state of a hydraulic connection between a fresh water supply of the airplane and at least one jetting system container of water that contains water used for the jetting onto the bird of the high pressure jet and which is hydraulically connected to the fresh water supply of the airplane for at least a first period between a takeoff of the airplane to the triggering of the jetting system.

According to an embodiment of the invention, the program storage device further includes selectively issuing a command to open any of at least one gas transmission permitting connection between at least one jetting system container that contains water used for the jetting onto the bird of the high pressure jet and its corresponding high pressure tank.

According to an embodiment of the invention, the program storage device further includes determining a desired jetting direction in response to the result of the analysis, and issuing a modification command instructing a jetting system component to modify a configuration of at least one nozzle prior to the jetting of the high pressure jet in response to the desired jetting direction.

According to an embodiment of the invention, the program storage device further includes issuing an alert to an external airplane system indicating that a jetting by the jetting system occurred, wherein the issuing is carried out after the analyzing.

According to an embodiment of the invention, the program storage device further includes selectively preventing triggering of the activation of the jetting system in response to received location information that is indicative of a location of the airplane.

According to an embodiment of the invention, the program storage device further includes determining activation parameters for the jetting system in response to environmental-condition indicative data that is indicative of at least one physical condition in an environment of the airplane.

According to an embodiment of the invention, the program storage device further includes determining activation parameters for multiple jetting instances of the jetting system.

According to an embodiment of the invention, the program storage device further includes determining the activation parameters for the multiple jetting instances in response to detection information that is received from the detector and which is indicative of detection of multiple birds at least partly concurrently.

According to an embodiment of the invention, the selective triggering includes autonomously triggering the activation of the jetting system without receiving commands from any external system.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 5B and 5C illustrates various stages of the method of FIG. 5A, according to various embodiments of the invention.

Figure 1:
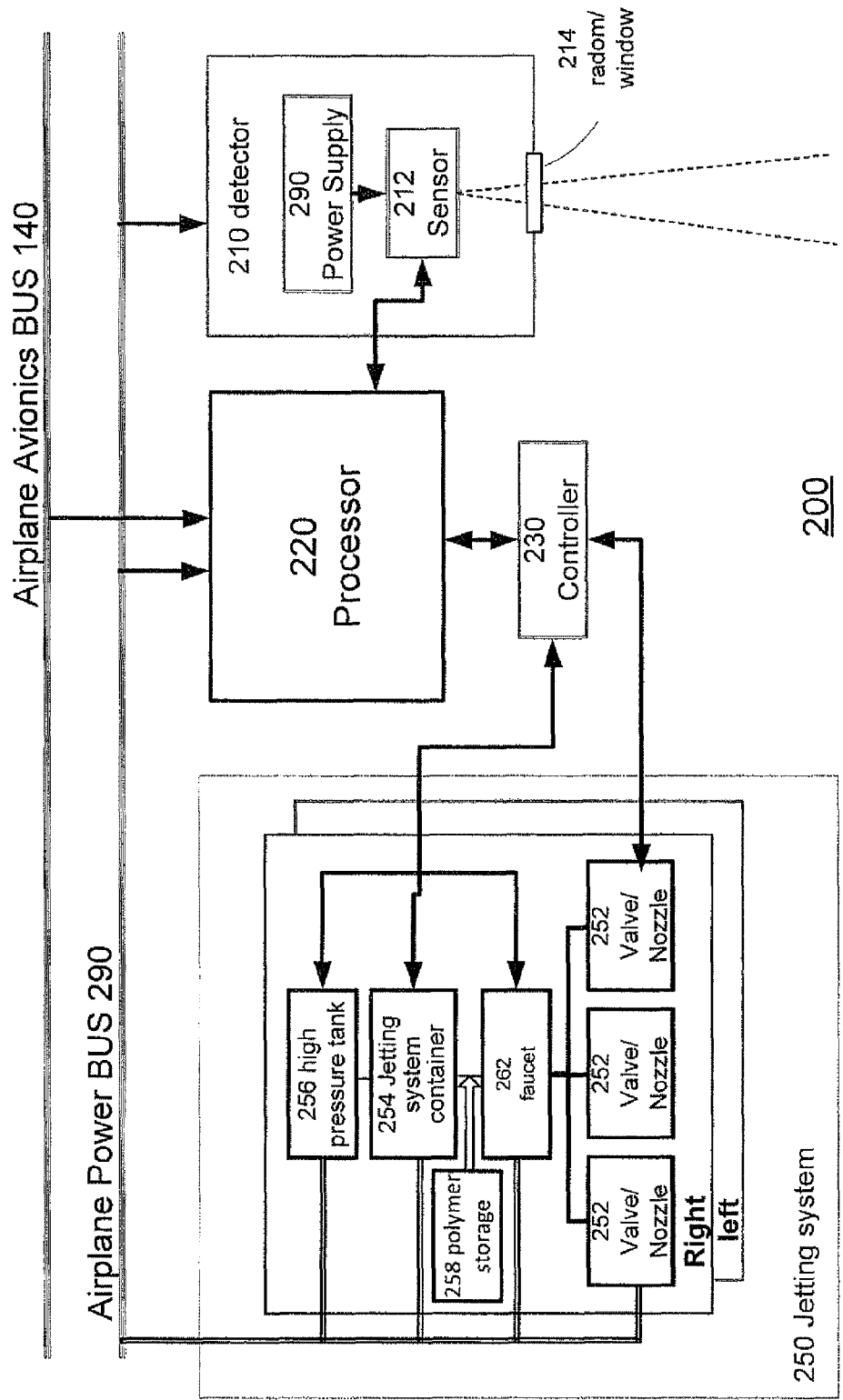
FIG. 1 is a block diagram of a system for reducing damage by birds to an airplane, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS

In the following detailed description, numerous specific details are set forth in order to provide a thorough understanding of the invention. However, it will be understood by these skilled in the art that the present invention may be practiced without these specific details. In other instances, well-known methods, procedures, and components have not been described in detail so as not to obscure the present invention.

In the drawings and descriptions set forth, identical reference numerals indicate these components that are common to different embodiments or configurations.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter one or more stages illustrated in the figures may be executed in a different order and/or one or more groups of stages may be executed simultaneously and vice versa. The figures illustrate a general schematic of the system architecture in accordance with an embodiment of the presently disclosed subject matter. Each module in the figures can be made up of any combination of software, hardware and/or firmware that performs the functions as defined and explained herein. The modules in the figures may be centralized in one location or dispersed over more than one location.

FIG. 1 illustrates system 200 for reducing damage by birds to an airplane (denoted 100), according to an embodiment of the invention. It should be noted that various embodiments of system 200 may be adapted and installed on various types of airplanes, and that the specific requirements for different airplanes, for different flight scenarios, for different types of birds, and so forth may dictate different implementations of system 200.

It should be noted that some embodiments of system 200 may be closely integrated into airplane 100 (e.g. even during manufacture thereof), while other embodiments may be standalone systems that are installed on airplane 100 and which in some implementation may even be moved from one airplane to another.

It is further noted that in some embodiments of the invention, some components of system 200 may also be used by other systems of airplane 100, and in some instances may be otherwise regarded as systems of airplane 100 itself. By way of example, power supply 290 of system 200 may be an independent power supply integral to system 100, while in other implementations components of system 200 may receive power from a power supply of airplane 100, in which case that power supply—even though it previously existed in airplane 100, may be regarded as power supply 290 of system 200 for the sake of the following discussion.

Likewise, it should be noted that in the description of the invention, components of system 200 which are described and/or exemplified as implemented as a certain number of components may be implemented in some embodiments using more or less components than described, as will be clear to any person who is of skill in the art. For example, even if a single power source 290 is described and exemplified in the figures, utilization of more than one separate power source (e.g. different power sources for different components of system 200) exceed neither the scope of the invention nor the scope of the disclosure. Taken in combination, it would be clear that—continuing the above examples—power source 290 may be implemented as several power sources utilized for some of the components of system 200 together with provision of power by systems of the airplane 100 to other components of system 200.

System 200 is intended to hit at least one bird in a vicinity of airplane 100 with one or more high pressure jets (e.g. of water), wherein such capabilities may be used for potentially reducing a possible damage of bird strikes. As will be discussed below in greater detail, according to various embodiments of the invention, system 200 may include one or more detectors 210, wherein each of the optional one or more detectors 210 is operable to detect a bird in a vicinity of airplane 100 and to generate detection information indicative of motion of the bird; a processor 220 that is configured to analyze the detection information and to selectively trigger—in response to a result of the analysis—activation of a jetting system 250 that is mounted on the airplane and which is operable to jet a high pressure jet onto a bird.

Figure 2A:
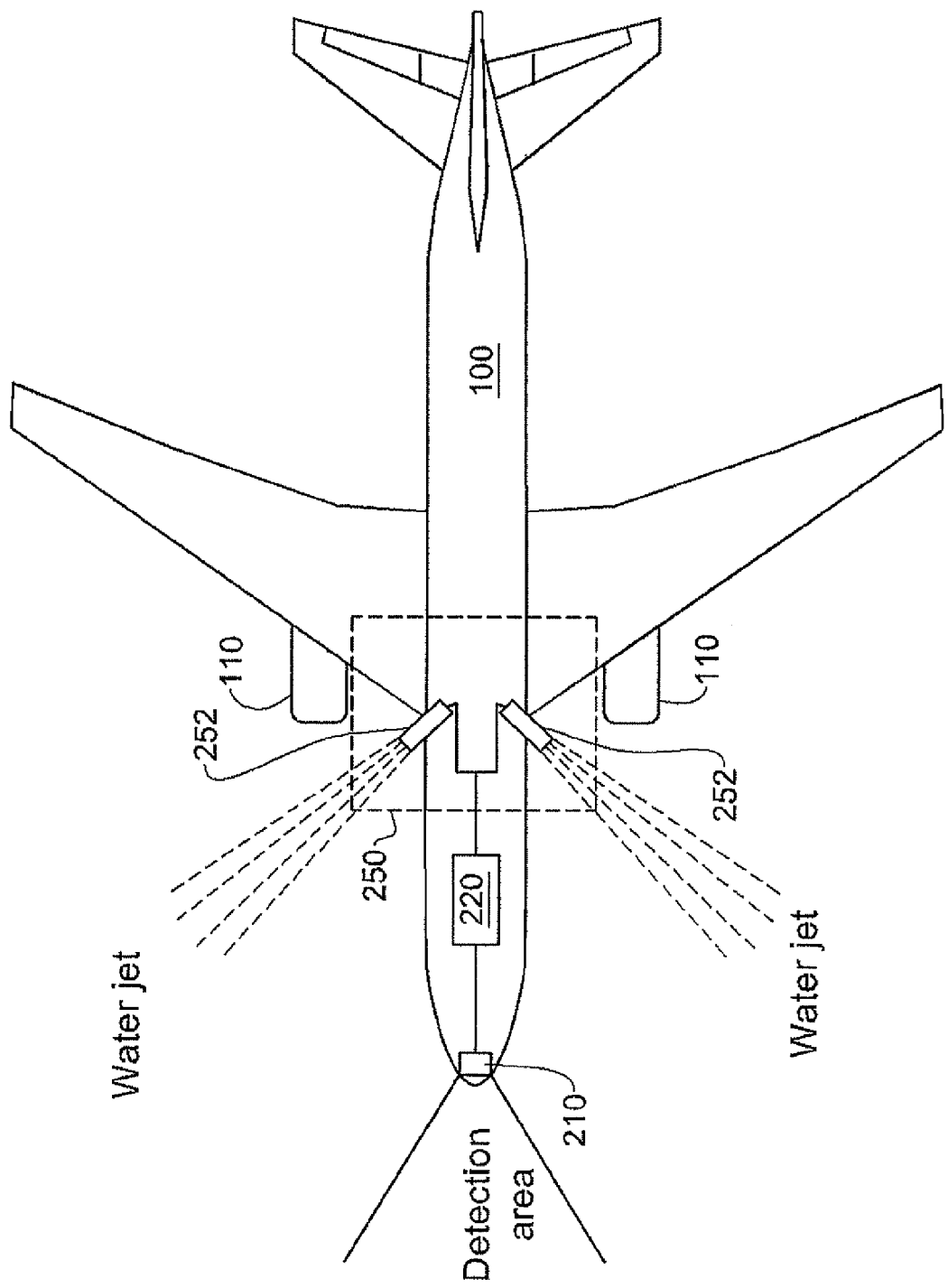
FIGS. 2A through 2F illustrate some possible implementations of the system of FIG. 1 on the airplane, according to various embodiments of the invention.
Figure 2B:
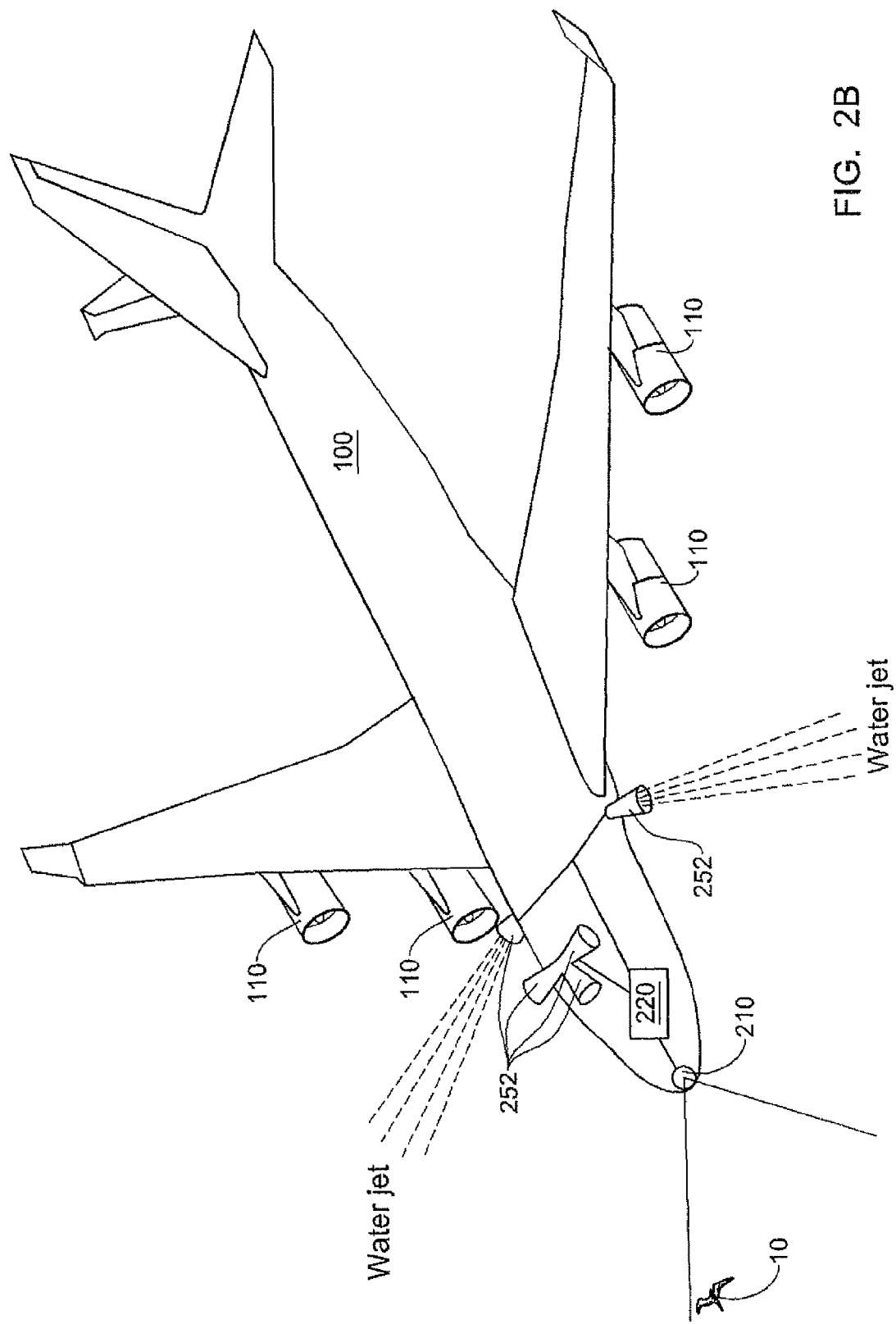
Figure 2C:
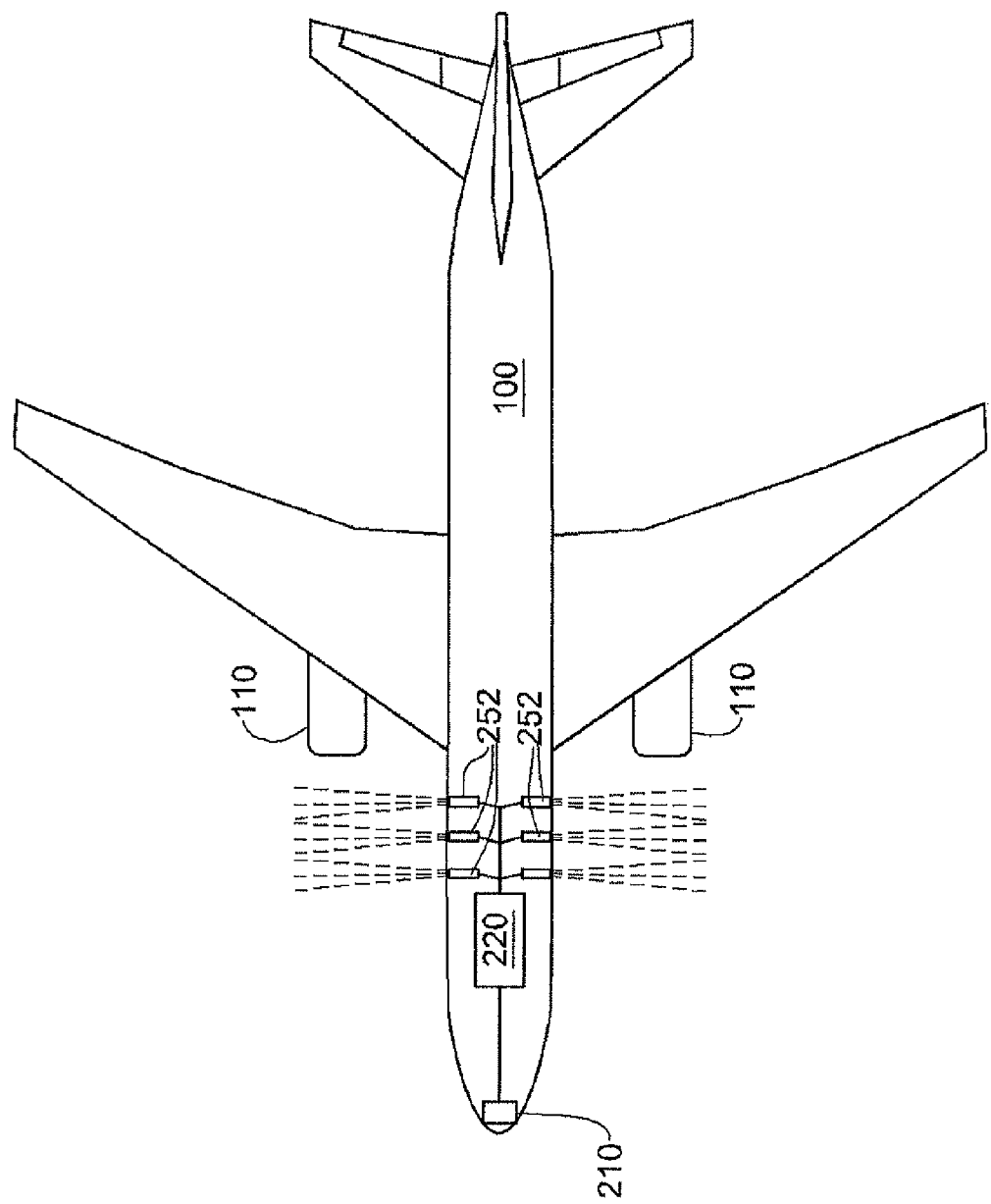

As stated above, system 200 may include at least one detector 210 that is operable to detect a bird (denoted 10, e.g. in FIG. 2B) in a vicinity of the airplane 100, and to generate detection information indicative of motion of the bird. In some embodiments of the invention, detector 210 is mounted on airplane 100, but this is not necessarily so and in other implementations detectors external to airplane 100 may also be utilized.

It should be noted that various types of detectors 210 may be implemented in various implementations of system 200—such as radar, light detection and ranging (LIDAR), optical detector, acoustic detector, and so forth. All the more so, system 200 may include more than a single detector 210 of one or more types. Different types of detectors may provide different kinds of detection information, detection information of varying quality (e.g. spatial and/or temporal resolution), and so forth. Selection of the type of detector 210 for a specific implementation may be made in considerations of various parameters, such as parameters of the detector itself (e.g. cost, size, electrical requirements, capabilities and so forth), parameters of airplane 100 (e.g. size of the airplane, geometry of the airplane and especially the positioning of its engines 110, existing detectors previously installed in airplane 100, and so forth), parameters pertaining to expected use (e.g. expected regime of velocities and altitudes), and so forth. It is however noted that any of all relevant detectors (e.g. as exemplified above) may be implemented in the different embodiments of the invention, mutatis mutandis, unless there is a physical prevention to such a combination.

As will be clear to a person who is of skill in the art, detector 210 may include various components such as one or more sensors 212, a Radom or window that permits transmission of radiation detectable by such sensors 212 (if applicable, denoted 214), and so forth.

According to an embodiment of the invention, detector 210 is a light detection and ranging (LIDAR) detector, operable to emit laser pulses and to detect the bird by detection of light reflected from the bird. According to an embodiment of the invention, detector 210 may be any other optical detector operable to detect the bird by detection of light reflected from the bird—either light emitted by such a detector or by a dedicated light source (which may or may not be controlled by such a detector), or light unrelated to the detector. For example, the optical detector may be a wide-beam laser detector.

The detection information provided by detector 210 may include any combination of a wide range of parameters in different embodiments of the invention. For example, the detection information may include information pertaining to one or more of the following parameters—current location of the bird (especially in relation to airplane 100), future expected location of the bird, relative speed of the bird, size of the bird, and so forth. In case more than one bird is detected, the detection information may pertain to each detected bird separately.

It should be noted that various types of detectors 210 and various configurations thereof (e.g. in relation to a body of airplane 100) may be utilized for different scenarios and utilizations. Considerations pertaining to the specific scenario and utilization for which a design of a certain implementation of system 200 is made may determine the vicinity to airplane 100 in which a detector 210 should be operable to detect the bird 10. It should be noted that a detection zone of each of the one or more detectors 210 implemented may not be symmetrically located with respect to airplane 210, both due to physical constrains and to requirements—the zone of interest for detection of birds is mostly in a frontal area of airplane 100, e.g. as exemplified in FIG. 2A.

The vicinity to the airplane 100 in which detector 210 may be required to detect birds is usually in a range of tens, hundreds, or thousands of meters (e.g. 10-1,000 meters) in its longest dimension (usually directly forward of the airplane 100 and/or of any of its engines 110), and is generally determined with respect to expected velocities of airplane 100, to the timing of operation of system 200 (and especially of processor 220 and of jetting system 250), and to the dimensions of airplane 100 (especially a distance between the detector 210 and any one or more of the engines 110 along a progression axis of airplane 100). It is however noted that the distance in which detector 210 may be operable to detect birds may well exceed the minimal required distance (especially for some kinds of detectors) and in some situations may even come short of that distance (e.g. in poor weather conditions). In any case the vicinity to airplane 100 in which a detector 210 is operable to detect birds may be determined on a case by case basis, in considerations with the above parameters.

Some or all of the detection information generated by any of the one or more detectors 210 (if implemented)—and especially detection information indicative of the motion of one or more birds 10 detected—is communicated to processor 220 of system 200. It should be noted that such detection information may be processed in some manner before it reaches processor 220, and it is not necessarily transmitted as raw data. For example, an aggregation unit (that may be a part of processor 220, but not necessarily so) may aggregate detection information gathered by several detectors 210 if implemented.

According to an embodiment of the invention, processor 220 may be connected to detector 210 either directly (e.g. using data cable connections, using wireless connection, etc.) or indirectly (e.g. using communication system of airplane 100, via a preprocessing unit—not illustrated, via a database—not illustrated—to which detector 210 saves its detection information and which is accessible to processor 220, and so forth). In some embodiments, processor 220 may even be integrated with detector 210 and/or with a processor thereof.

Processor 220 is configured to selectively trigger activation of a jetting system 250 that is mounted on airplane 100. According to an embodiment of the invention, processor 220 may be further configured to analyze the detection information (some or all of it), wherein processor 220 may be configured to selectively trigger the activation of the jetting system in response to a result of the analysis.

It should be noted that in some embodiments of the invention, processor 220 may be configured to selectively trigger the activation of the jetting system in response to other events—and not necessarily to analysis of detection results. For example, according to an embodiment of the invention, processor 220 may be configured to selectively trigger the activation of jetting system 250 according to timing information, to altitude information, to instructions of another system, and so forth. In an exemplary implementation, processor 220 may be configured to recurrently selectively trigger the activation of jetting system 250 for jetting high pressure jets when airplane 100 is flying through an area which is considered susceptible to bird strikes, or in such altitudes.

As will be described in more detail below, jetting system 250 is operable to jet at least one high pressure jet which may be used to hit a bird (following a successful triggering of jetting system 250) and as such to reduce its damage potential to airplane 100.

It should be noted that in different embodiments of the invention, processor 220 may be implemented in different ways. For example, processor 220 may be a dedicated processor designed to implement the functionalities of system 200, may be a programmable processor programmed to implement the functionalities of system 200, a general purpose processor operable to run dedicated software that implements functionalities of system 200, a processor of airplane 100 (or of another subsystem thereof) that can run a dedicated software, a combination of any of the above, and so forth.

A communication between processor 220 and jetting system 250 may be facilitated, according to some embodiments of the invention, via one or more controllers 230 that are operable to control an activation and/or operation of jetting system 250, and which are configured to receive instructions from processor 220. Controller 230 may be implemented (if at all) as part of processor 220, as part of jetting system 250, and as an independent unit.

The selective triggering of the activation of the jetting system 250 is usually intended to result in activation of jetting system 250 only in situations in which such operation is regarded as desired—e.g. for prevention of bird strike to an engine 110 (or other part of airplane 100) or for reducing the likelihood of such an incident. In other embodiments of the invention, other considerations and/or decision rules may be implemented—either alternatively or in addition to these described above.

It should be noted that processor 220 may receive from detector 210 for analysis only detection information which pertains to positive detection, but this is not necessarily so, and in some embodiments of the invention detector 210 and/or any component intermediating between it and processor 220 may not be required to determine whether detection actually occurred—and this task may be assigned to processor 220.

Since system 200 may be designed and/or considered an emergency security system, in various implementations it may operate at its own discretion, without intervention by an external system and/or human intervention. Therefore, according to an embodiment of the invention, processor 220 may be configured to autonomously trigger the activation of the jetting system without receiving commands from any external system—wherein, it should be noted, even when the originator of commands is a person (e.g. a pilot of airplane 100), the commands are transmitted to processor 220 via an external system (e.g. operated by that person).

In some embodiments of the invention, an external system (or person) may have some influence regarding the activation of system 200, and especially of jetting system 250. Not only can such an external entity provide information which may affect the selective determining by processor 220 (e.g. information of airplane system indicating external metrological conditions), in some embodiments such an external entity may determine, for example, an activation permission status for system 200 or for components thereof.

It should be noted that such an external entity may not be located onboard airplane 100. In an example, in some implementations an activation of the jetting system 250 may not be desired in some locations or conditions (e.g. at ground level, within hangers, etc.), wherein entities that prevent the jetting in such location may be positioned onboard (possibly even as part of system 200) and/or externally to it (e.g. an airfield system). In another example, an external entity may instruct the triggering of the activation of jetting system 250 using lower than normal thresholds of detection—e.g. following visual detection of a flock of birds (either by pilot, RADAR etc.), in areas that are more prone to bird strikes, when other conditions of airplane 100 deteriorate and it is more susceptible to bird strike damage, and so forth.

Other than selectively determining to trigger the jetting system 250 (and thus determining timing of the jetting of the high pressure jet by jetting system 250), processor 220 may be further configured to determine activation parameters of jetting system 250, where and if applicable. Determination of such activation parameters for jetting system 250 may be responsive at least in part to a result of said analysis, but this is not necessarily so. For example, one scenario in which activation parameters may be determined in respect to other kinds of factors is limiting a pressure of the high pressure jet until leaving airfield area.

According to an embodiment of the invention, processor 220 may be further configured to receive location information indicative of a location of airplane 100 (be it absolute location information such as GPS positioning data, relative location information such as distance from a given point, and/or partial location information such as altitude only, and so forth) and to selectively prevent triggering of the activation of jetting system 250 in response to the location information. This may be used, for example, for preventing activation of the system within the area of an airport, at ground level, below or above a given altitude, and so forth. As described at more details elsewhere in this application, such location information may be used by processor 220 for other needs as well, such as determining activation parameters, etc.

In some examples of various embodiments of the invention, activation parameters that may be determined by processor 220 (e.g. in response to its analysis of detection information received from one or more detectors 210 and/or from other sensors, in response to airplane 100 information received from systems of the airplane, in response to a condition of system 200 such as available amount of water for jetting, and any combination thereof) are:

Desired direction of jetting (if modification of jetting direction is possible);

Identity of one or more nozzles that should participate in the jetting (if more than one nozzle is implemented);

Number and timing of multiple jets to be jetted, whether concurrently or sequentially (if jetting of multiple jets is desired);

Amount of water and/or pressure thereof for the high pressure jet (if can be modified);

Prerequisite activities that should be performed prior to the jetting, such as frost melting (if implemented, possible and required).

It should be noted that this list is not inclusive by any means and that other activation may be implemented (if at all), either in addition or instead of any combination of the above example parameters.

As aforementioned, at least some of the parameters that may influence a decision and/or value determination/selection by processor 220 may be received from external system of airplane 100. In an example, processor 220 may be further configured to receive from at least one external system of airplane 100 (such as airplane avionics system represented by BUS 140 in FIG. 1) environmental-condition indicative-data that is indicative of at least one physical condition in an environment of airplane 100, and to determine activation parameters for jetting system 250 in response to the environmental-condition indicative-data. Some examples of such environmental conditions that may be indicated in the environmental-condition indicative-data according to various embodiments of the invention are environmental pressure, wind direction and intensity, humidity, temperature, etc.

In most scenarios, processor 220 would take into consideration the velocity of airplane 100 (and more specifically—the relative velocity of the bird 10 in relation to airplane 100, but the velocity of the bird itself is usually negligible in relation to the velocity of the airplane) when determining the timing and possibly additional activation parameters of jetting system 250. The additional data considered, such as the parameters and information exemplified above, and among which the environmental-condition indicative-data, may be used to affect this determination (usually only refining it, but not necessarily so).

Since striking by a bird when the hit is made to some parts of airplane 100 is more dangerous than when a hit is made to others, prioritization may be made to focus the activity of system 200 in some areas of airplane 100 and its environment in comparison to other areas. Such focusing may be implemented both by detector 210 (e.g. setting of detection area), by processor 220 (e.g. in its analysis of the detection information), and by jetting system 250 (e.g. by positioning of the nozzles of jetting system 250 accordingly).

According to an embodiment of the invention, processor 220 is further configured to analyze the detection information to determine assessed potential of damage by the bird to an engine 110 (or to several engines 110) of airplane 100, and to selectively trigger the activation of jetting system 250 in response to a result of the analysis. In other embodiments, processor 220 may likewise determine assessed potential of damage to other parts of the airplane (e.g. windshield, tail) and to selectively trigger the activation of jetting system 250 accordingly.

Additionally, according to an embodiment of the invention, processor 220 may be further configured to issue, following the analysis (and either before, during, or after the jetting itself) an alert to at least one external system (an airplane system and/or a system external to airplane 100) indicating that a jetting by jetting system 250 occurred. Such information may affect, in an example, a decision of a pilot of airplane 210 to modify course of the airplane, to cancel the planned flight and to land as soon as possible, etc. It should be noted that additional alerts may be made regardless of any specific jetting—e.g. detector 210 may detect several birds in a vicinity of airplane 100 that are not expected to hit any engine 110 of the airplane, but this information may nevertheless be useful to a pilot who may decide to ascend to higher altitude in which encounters with birds are less likely.

Figure 3:
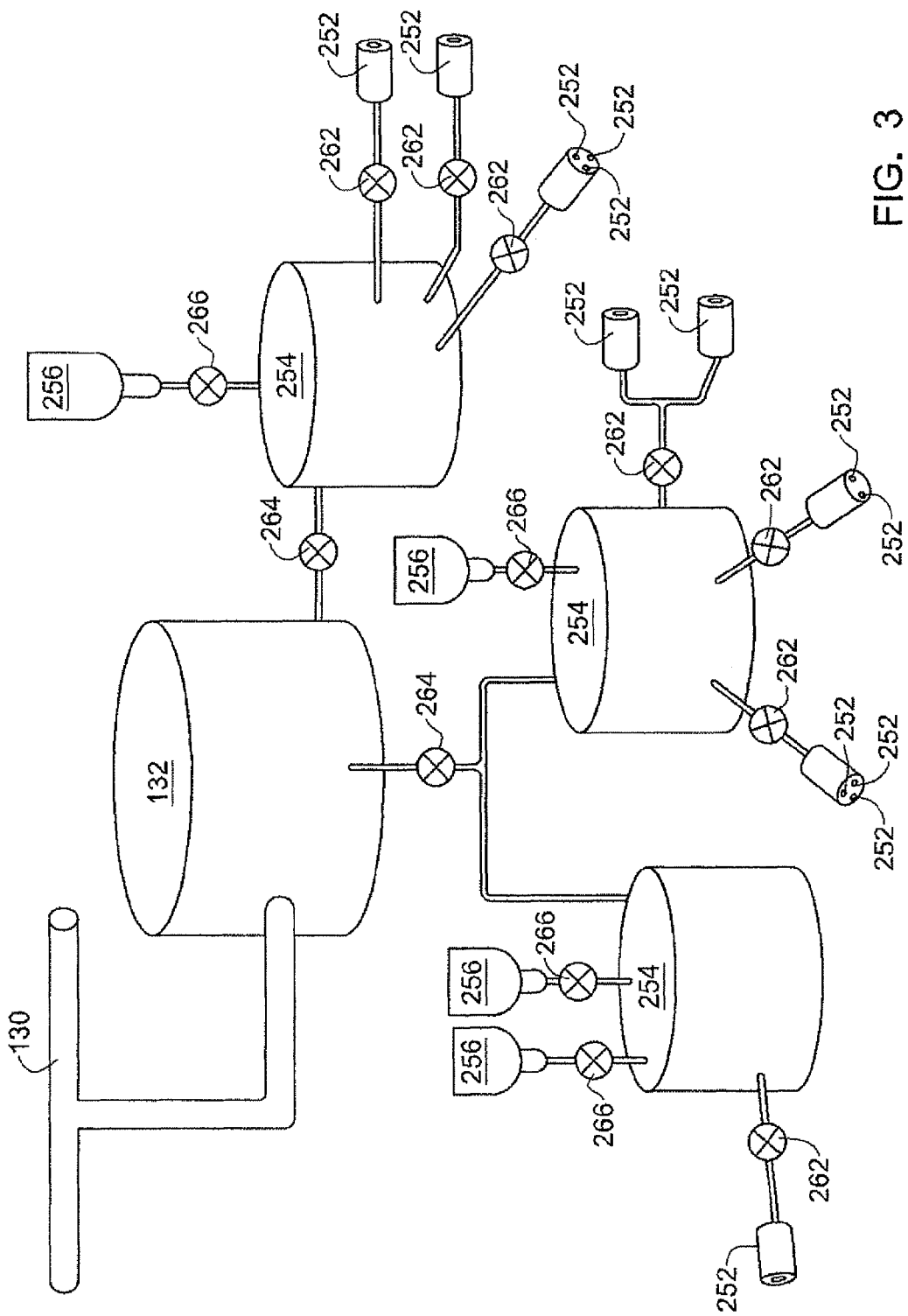
FIG. 3 is illustrates a jetting system, according to an embodiment of the invention.

Referring now to jetting system 250 that is operable to jet the high pressure jet onto the bird. A possible implementation of jetting system 250 is schematically illustrated in FIG. 3. As will be demonstrated below, according to various embodiments of the invention, jetting system 250 may be operable to jet a different number of jets (e.g. a single jet, multiple jets jetted at different times, multiple jets jetted concurrently in a predetermined configuration, and so forth), in different timing regimes, in different configurations, shapes, intensities, and so forth.

Jetting system 250 includes one or more nozzles 252 from which high pressure jets may be jetted. Each of the one or more nozzles 252 is characterized by having an aperture or spout from which fluid of the high pressure jet is discharged during its jetting. It should be noted that size, shape, material, efficiency, capabilities, etc. may differ between different nozzles 252 of a single jetting system 250, and between different implementations of system 200.

According to an embodiment of the invention, the high pressure jet is a jet of water. It should be noted that such water would conveniently not include any dissolved material in a quantity that effectively influences the behavior of the jetted water when compared to pure water. Such water may be, for example, tap water or general reservoir water, and may come—by way of example, from a fresh water supply system 120 of airplane 100.

According to other embodiments of the invention, the high pressure jet may include other types of fluids, such as water (e.g. similar to the above discussed water) to which one or more materials (e.g. polymers) were added, for example in order to modify a physical characteristic of that fluid—e.g. surface tension thereof. In other embodiments, other types of fluids may be used, such as a combination of water with any other liquid or gas, and different types of liquids.

While the possible types of fluids that may be jetted by jetting system 250 is not limited to these exemplified above, it should be noted that utilization of water for the jetting may be preferred in some scenarios, at least for the following reasons:

Water is dense enough a fluid to acquire enough tension to substantially affect a trajectory of the bird.

Water is practically harmless to engines 110 or other parts of airplane 100—it should be noted that engines 110 and other airplane parts are designed and tested to withstand high amounts of water (e.g. during rain).

Water is neither toxic nor explosive, and is considered safe by aviation regulation bodies to be stored and utilized in airplanes without additional measures of precaution.

Water is already carried by most commercial airplanes (especially by these used for passenger transportation).

It is however noted that despite of the above, the invention is by no means restricted to water jets only, and other fluids (especially, though not necessarily, liquids) may be utilized—in addition to or without water.

According to an embodiment of the invention, at least one component of jetting system 250 is operable to administer polymeric material (e.g. from polymeric material storage 258), which is characterized by its usability for modifying surface tension of water, into jetting-system-container water before jetting the high pressure jet that includes the water from the at least one jetting system container 254. The polymeric material may be added to the water when in the jetting system container, but may also be added at a later stage prior to the jetting.

Desired position of the one or more high pressure jets in relation to the airplane may differ in different scenarios, depending on factors such as (for example) type of the airplane, desired type and extent of protection, implemented detection capabilities, available jetting capabilities (e.g. pressure, distance, volume), type of threat (e.g. bird size and weight), and so forth.

It would therefore be clear to a person who is of skill in the art that the various locations described and illustrated below are only exemplary, and that other locations—of jets, of nozzles, and/or of other components of system 200 such as of jetting system 250 and/or of detector 210—may also be implemented (in some scenarios possibly even in a more efficient way, mutatis mutandis).

It should be noted that in various embodiments of the invention, each of the different possible locations on the airplane in which jets may be installed may have advantages in different scenarios/situations, and it is therefore further stressed that the exemplified locations are but mere examples of locations that may be useful in some of these possible scenarios/situations.

Figure 2D:
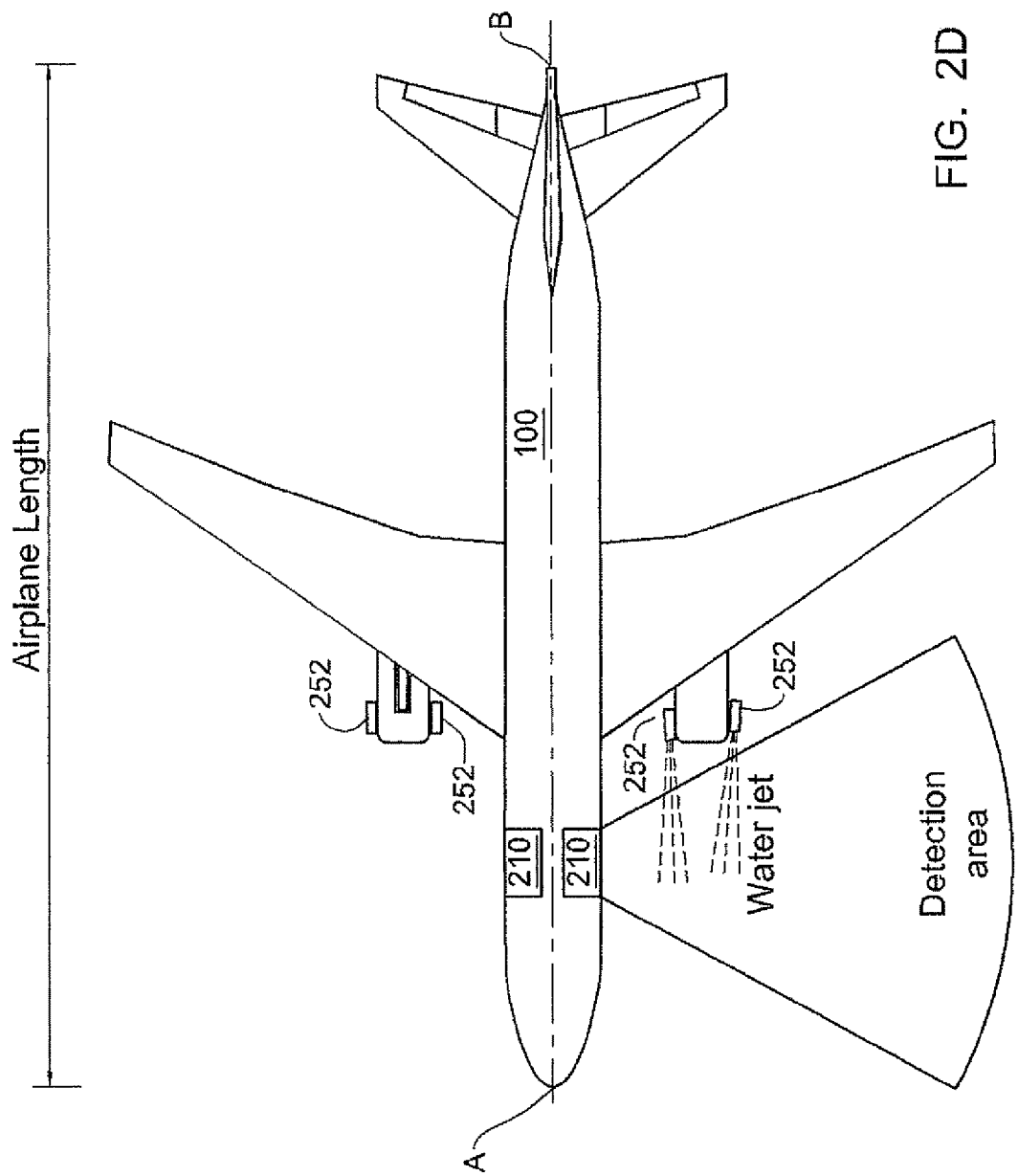
Figure 2E:
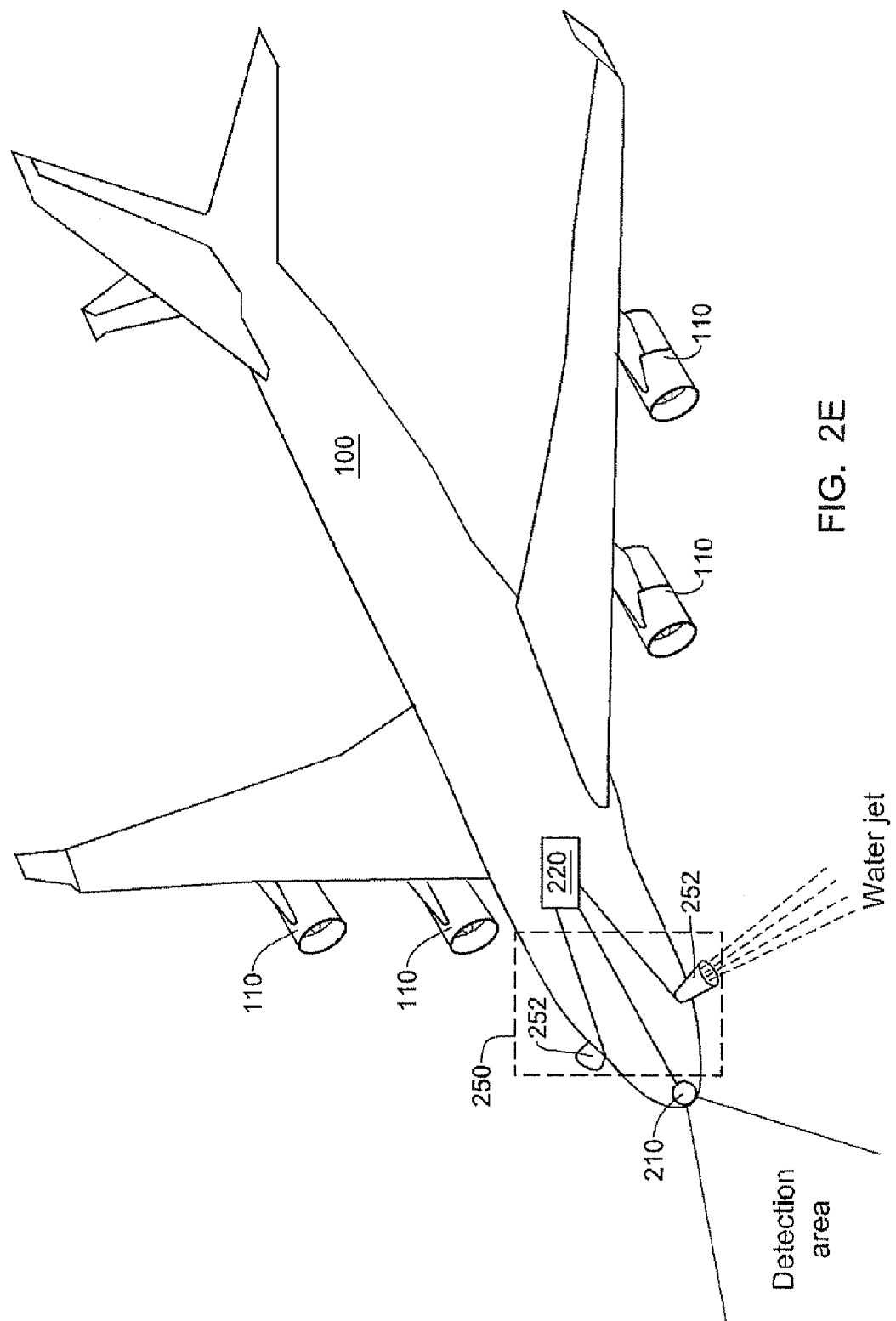
Figure 2F:
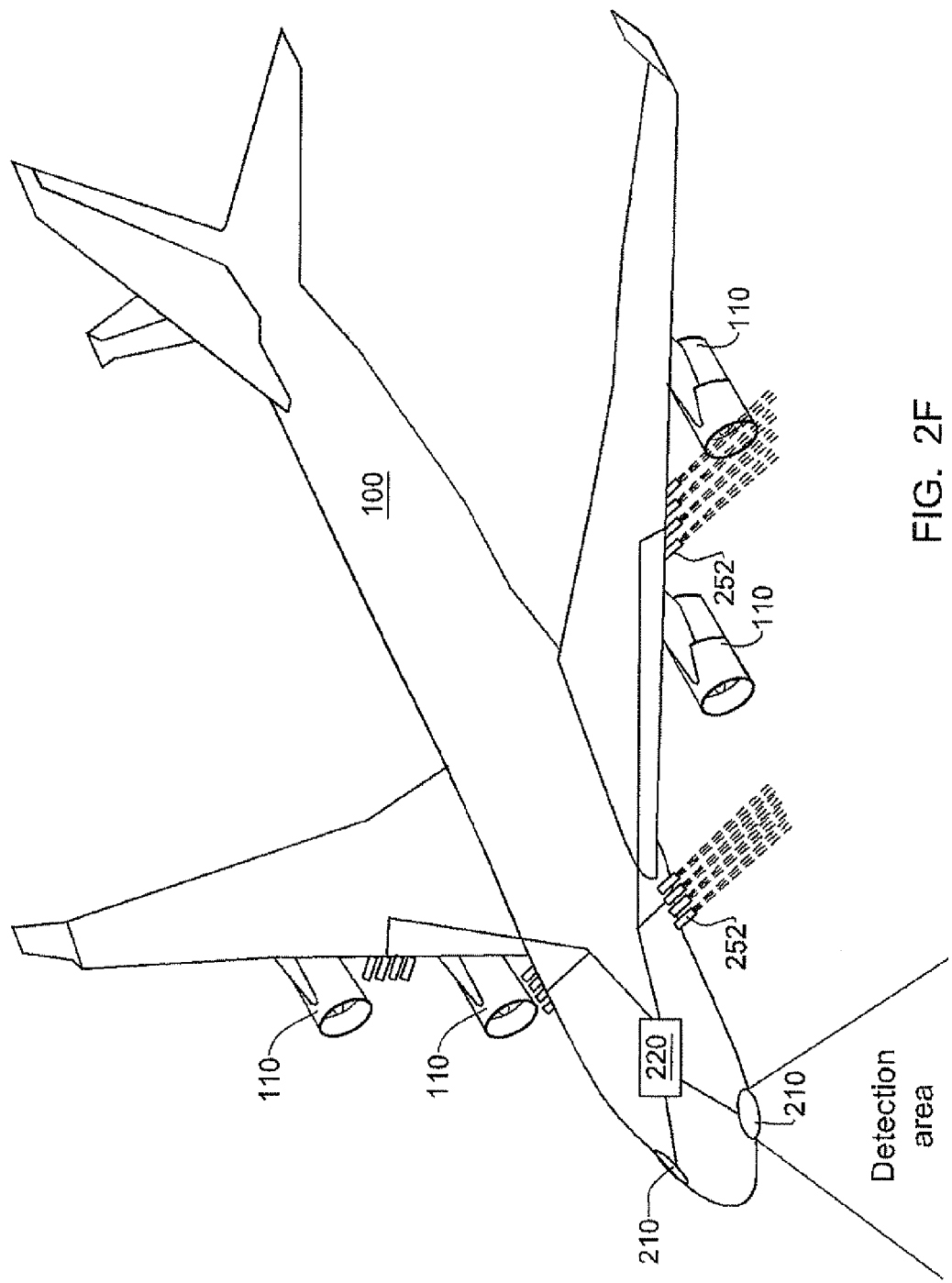

According to an embodiment of the invention, at least one nozzle 252 of jetting system 250 is located in a front portion of airplane 100 (e.g. in or near a cone of it). Such a configuration, an example of which is illustrated in FIG. 2F, enables a wide range of possible jetting directions, such as forwards, to the sides, up and down, and in diagonal angles—both backwards and forwards. Naturally, not all of these options are necessarily implemented in every such embodiment of the invention.

The proximity of the at least one nozzle 252 to the front of airplane 100 in such a configuration may differ in different implementations, and may depend on various factors (such as the one discussed above in relation to the general positioning of jetting system components). For example, according to an embodiment of the invention, a distance between a frontmost part of a nose of airplane 100 and a nozzle of jetting system 250 used for the jetting of the high pressure jet is shorter than 5% of a length of airplane 100 (wherein this length is measured between the frontmost part of the nose of airplane 100, denoted A in FIG. 2D, and a rearmost part of airplane 100, denoted B in FIG. 2D). Thus, in a 73 meters long Airbus A380-800 airplane, such a nozzle may be located within some 3.5 m from the frontmost part of the nose. It should be noted that this distance may be measured as a projection on a longitudinal axis of the airplane connecting a front end of the airplane and a rear end of airplane 100. In other embodiments of the invention, the frontmost nozzle 252 of jetting system 250 may be located at the front of airplane 100, but somewhat more distanced from the frontmost part—e.g. at a distance less than 10% (or 15%) than the frontmost part of airplane 100. A person who is of skill in the art would understand that these numbers are given by way of example only, and that the actual numbers have to be adjusted for the implemented system.

According to an embodiment of the invention, at least one nozzle 252 of jetting system 250 is located substantially near a component of airplane 100 that is prone to serious damage if struck by a bird (or to which protection is otherwise desired)—such as an engine 110. Such a configuration, an example of which is illustrated in FIG. 2D, enables jetting of a high pressure jet toward birds that come dangerously close to said component of airplane 100. It should be noted that in some embodiments of the invention such a nozzle 252 may be used to jet high pressure jets to protect more than a single sensitive component (e.g. protecting two adjacent engines 110).

For example, according to an embodiment of the invention, a distance between a wing of the airplane and a nozzle 252 used for the jetting of the high pressure jet is shorter than a distance of the nozzle from the frontmost part of the nose of airplane 100 and is also shorter than a distance of that nozzle 252 from the rearmost part of airplane 100. Alternatively, said distance may be measured from an engine 110 of airplane 100 (rather than from the wing).

For example, such one or more nozzles 252 may be located on the engine structure of the engine 110 itself, on the wing that carries that engine 110 and/or on a body of airplane 100, in proximity to a connection of the wing and the body. The jetting direction of such nozzles 252 may vary in different embodiments of the invention (and even between different nozzles 252 of a single implementation)—e.g. substantially forward, substantially to the side, substantially upwards or downwards, or diagonally.

However, in such a case in which one or more nozzles 252 are located in proximity to an engine 110, a direction of the jet jetted from that nozzle 252 may cross a space located in front of the engine, the direction from which birds are expected to strike the engine 110 (due to the high velocity of airplane 100 when compared to the of birds). It should be noted that a direction of a jet that is jetted from any given nozzle 252 may be perpendicular to a plane of an aperture of that nozzle 252 (if at all planar), but this is not necessarily so.

As aforementioned, the distance from an airplane component of a nozzle 252 that is designed to assist in protecting the component may be relatively small in relation to the size of the entire airplane 100. For example, a distance between such a component (e.g. an engine 110) of airplane 100 and a nozzle 252 used for the jetting of the high pressure jet (or, according to another form of characterization, a projection of that distance on a longitudinal axis of airplane 100 connecting a front end of airplane 100 and a rear end of airplane 100, denoted by the AB line in FIG. 2D) is smaller than 5% of the length of airplane 100 which is measured—as aforementioned—between the front and rear ends of airplane 100. Other relations may also apply in some embodiments of the invention (e.g. less than 1% of the length, less than 3% of the length, less than 10% of the length), or be measured in relation to other characteristic dimensions of airplane 100 (e.g. less than 5% of the wing span of airplane 100).

It should be noted that the distance of any nozzle 252 from a sensitive component which is ought to be protected by it may not necessarily be small. Since the velocity of airplane 100 is expected to be higher than that of any nearby bird (most birds do not cruise in speeds that exceed 20 meters per second (m·s−1) in comparison to a possible 200 m·s−1 by an exemplary airplane. Even the fastest bird when swooping does not reach half of this velocity), and therefore birds may jeopardize a given airplane component when within imaginary cone of relatively small aperture expanding from that object towards the front of the plane. Therefore, the distance of the farthest point in this imaginary cone from a body of airplane 100 is not much farther than that of said object. If that cone locus is within an effective distance of the high pressure jet, in some embodiments of the invention a nozzle 252 may be located much more forward in relation to the airplane 100 (e.g. on more frontal a location on a body of airplane 100) and still protect that component. Thus, for example, a nozzle 252 located substantially in the front of airplane 100 (e.g. as previously described) may jet high pressure jets that would hit a bird that would otherwise endanger an engine 110 of that airplane that is located on its wing.

It would therefore be clear to a person who is of skill in the art that nozzles 252 in different configurations may be positioned in different directions with respect to a longitudinal axis of airplane 100 (e.g. in order to more effectively cross said cone in which birds may seriously endanger the airplane).

According to an embodiment of the invention, an angle between a jetting direction in which jetting system 250 (such as by at least one nozzle 252 of which) is operable to jet the high pressure jet (or a high pressure jet, e.g. if system 200 may jet more than one high pressure jet) and a progression direction of airplane 100 is between 80° and 100°. This angle may also be measured with respect to the longitudinal axis of airplane 100. It should be noted that in such a scenario, an angle between the jetting direction and an imaginary line connecting wingtips of airplane need not be very large (unless protection of the tail or other specific components is required). A person who is of skill in the art would understand that these numbers are given by way of example only, and that the actual numbers have to be adjusted for the implemented system.

A note should be taken, that the direction in which the high pressure jet is jetted is not necessarily a direction in which the high pressure jet progresses in its entire course. For example, drag effects of ambient atmosphere may result in bending of the high pressure jet during its progression.

It should be noted that measurement of the angle with respect to the longitudinal axis or to the progression direction of airplane 100 may matter in strong winds, wherein such directions may somewhat deviate one from the other.

In the configuration discussed above, the jetting direction may largely be regarded as more-or-less perpendicular to the progression direction of airplane 100 (or, respectively, to its longitudinal axis). In another configuration, an angle between a jetting direction in which jetting system 250 is operable to jet the high pressure jet and a progression direction of airplane 100 (or, in another definition, a longitudinal axis of which) does not exceed 5°. It will be clear to a person who is skilled in the art that any other intermediary jetting direction (not substantially perpendicular to the longitudinal axis and not substantially parallel to which, but rather substantially diagonal) may also be implemented, e.g. as exemplified below.

In yet other configurations, an angle between the jetting direction of any one of the one or more jets jetted by jetting system 250 may be different—e.g. between 5°-10°, between 10°-20°, between 20°-30°, between 30°-40°, between 40°-50°, between 50°-60°, between 60°-70°, between 70°-80°, and any combination thereof. A person who is of skill in the art would understand that these numbers are given by way of example only, and that the actual numbers have to be adjusted for the implemented system.

However, jetting by any one nozzle 252 may not necessarily be in a direction set during manufacture or even during takeoff. In some embodiments of the invention, jetting direction of the jet jetted from any one or more nozzles may be determined and set during operation—and even in response to the detection data.

According to an embodiment of the invention, processor 220 is further configured to determine a desired jetting direction in response to the result of the analysis, wherein a configuration of at least one nozzle 252 is modified prior to the jetting of the high pressure jet in response to the desired jetting direction.

Modification of the jetting direction in response to the desired jetting direction determined by processor 220 may be implemented in different ways in different embodiments of the invention. For example, at least one component of jetting system 250 may be mechanically pivoted or otherwise turned, a selection between various nozzles or nozzle apertures (which may be interchangeable) may be made, a shape of an aperture of at least one nozzle may be made, an additional force (apart from the one used for the jetting) may be applied on the jet after it leaves the nozzle by another component of jetting system 250 (e.g. by channeling air through which airplane 100 flies).

It should be noted that there be many technical alternatives for jetting the high pressure jet, many of which are known in the art and are readily implementable by a person who is of skill in the art. For example, the jetting may be facilitated by utilization of pressured gas, by utilization of one or more types of pumps, by mechanical pressure applied to the water to be jetted, and so forth.

In some embodiments of the invention, jetting system 250 may include one or more jetting system containers of water (denoted 254) operable to store water that will be used for the jetting when required. It will be understood by a person who is of skill in the art that equivalent containers that may store different types of fluids may also be implemented, where such other fluids (especially liquids) are utilized.

According to an embodiment of the invention, jetting system 250 is operable to jet onto the bird the high pressure jet that includes water (or equivalent fluid, as discussed above) from the at least one jetting system container 254. Throughout the following disclosure it should be noted that in other embodiments of the invention, fluids other than water may be implemented, instead of or in addition to water. It is should further be noted that the container 254 may be a container of airplane 100 or of another sub-system thereof, e.g. in case that the fluid used for jetting is stored in airplane 100 regardless of system 200 (this is especially true for water, but it should be noted that a variety of other fluids are also stored and routinely used in many airplane functions, and some of these fluids may be utilized in other embodiments of the invention).

Even if not sharing the same containers, and/or if the jetting system requires dedicated containers for its operation, one or more of the jetting system containers 254 and at least one external container (e.g. water containers routinely installed in commercial airplanes) may still be connected by a hydraulic connection that permits transmission of the contained fluid (e.g. water) between the internal and the external containers.

Referring to FIG. 3, in which a detailed view of containers of jetting system 240 is exemplified according to an embodiment of the invention, it should be noted that according to an embodiment of the invention, at least one jetting system container 254 of water is hydraulically connected to a fresh water supply (denoted 130) of airplane 110 for at least a first period between a takeoff of the airplane to the triggering of the jetting system. It should be noted that the connection to the fresh water supply may be a connection to a container 132 of fresh water supply 130, to a pipe of fresh water supply 130, or to another component which contains water for at least a part of the first period.

It should further be noted that the first period may last for different whiles in different implementations. For example, the hydraulic connection may be a fixed hydraulic connection, may be a hydraulic connection that is only opened for one or more relatively short periods of pressure equalization, may be terminated (e.g. by way of a faucet) in response to a result of the analysis, may depend on airplane 100 system commands, and so on and so forth. However, according to such an embodiment of the invention, it may be opened for at least a while between the takeoff and the triggering.

It should be noted that in at least some implementations of system 200, the hydraulic connection may be a plain connection—such as a pipe—in the sense that compression or decompression or other alteration of the pressure of water during passage in that hydraulic connection is not intentionally implemented for any substantial reason. As is exemplified below, differences of pressure between jetting system containers 254 and fresh water supply 130 may be implemented at a later stage—while the two are not hydraulically connected in a way that permits transference of water between the two. Yet, according to an embodiment of the invention, a difference between water pressure in any of the at least one jetting system container 254 and water pressure of the fresh water supply 130 is less than 5% at times of such a hydraulic connection.

A notice is made to that the term "hydraulic system of the airplane" or like terms as used in this document do not refer particularly to hydraulic systems that utilize fluid power of pressurized hydraulic fluid to drive mechanical components such as hydraulic motors, brakes of the airplane and the like. Such terms rather refer to fluidal systems in a wider sense of "consisting of or pertaining to fluids". Likewise, the term "hydraulic connection", or like terms, refers to any connection that enables passage of fluid, regardless of whether this connection is also utilized for transmission of power. Hydraulic connection as used herein may be applied, by way of example, to any communicating vessels (or container) of an atmospheric pressure fresh water system of airplane 130.

It should be noted that in some embodiments, dedicated jetting system containers 254 may be implemented, that store water (or other fluid) without any hydraulic connection to hydraulic systems of airplane 100 (such as fresh water system 130). One possible reason to prefer the hydraulic connection to the airplane hydraulic system is that none or less dedicated fluid is required—which reduces weight (which is an important factor in aviation) and possibly even reduces the volume of jetting system 250 (e.g. if a single container 254 may be filled from the fresh water system 130 more than once).

Implementation of multiple jetting system containers 254 may be desirable for a variety of reasons. For example, different jetting system containers 254 may be used by different nozzles 252, especially if the latter are located at substantially remote ports of airplane 100. Another reason may be that in some embodiments of the invention, each jetting system container 254 may be used for the jetting of only a single jet, and if jetting of multiple jets is desired, multiple jetting system containers 254 should be implemented. Other reasons may lead to such a configuration as well, as previously expressed.

According to an embodiment of the invention, the jetting of fluid (e.g. water) from one or more jetting system containers 254 is achieved using high pressure gas. According to an embodiment of the invention, each of the at least one jetting system container 254 is connected to a corresponding high pressure tank 256 that contains high pressured gas. It should be noted that the connection is a connection that permits (or selectively permits—at some times) transmission of gas from the high pressure tank 256 to the corresponding jetting system container 254—but not necessarily enables transmission of material in the other direction (e.g. due to the substantial pressure difference). The high pressure gas, according to such an embodiment of the invention, may provide at least some (and possibly all or substantially all) of the pressure required for the jetting of a high pressure jet that includes water from the respective jetting system container 254.

The connection between containers 254 and gas tanks 256 may be on a one-to-one basis, wherein each container 254 is connected to a single gas tank 256 and vice versa, but this is not necessarily so. In some embodiments of the invention multiple gas tanks 256 would be connected to a single container 254 (e.g. if a lot of high pressure gas is required) while in some embodiments multiple containers 254 may be connected to a single gas tank 256 (e.g. if jetting from multiple containers—such as from nozzles located in different parts of airplane 100—is desired). Combinations of these two configurations may also be implemented.

The pressure of gas in the one or more gas tanks 256 may vary between different embodiments of the invention. For example, according to an embodiment of the invention, each high pressure tank 256 may contain gas at a pressure of 9,000 to 10,000 pounds per square inch (PSI). According to an embodiment of the invention, at least one of the one or more high pressure gas tanks 256 can contain high pressure gas at a pressure that exceeds 1,000 pounds per square inch (PSI). It will be clear to a person who is of skill in the art that other ranges of pressure (e.g. 3,000-5000 PSI, 5000-9,000 PSI, etc.) may also be implemented, depending on other parameters of system 200 and airplane 100, as well as on characterizations of operational need (e.g. required effective distance for a jet, its duration, and so forth).

A note should be made to safety consideration. Storage of gas in such high pressures onboard a civilian airplane may be regarded as somewhat dangerous. There are various types of precaution measures that may be implemented in order to reduce such danger, many of which are known in the art. For example, the gas tank 256 itself may be a gas tank that does not explode under excessively high pressure, but rather cracks and allows the gas to be released in a controlled fashion (whether in gaseous form or in the form of liquid). Another exemplary means of precaution is positioning the high pressure tanks 256 in locations in which an undesirable malfunctioning of such a tank would cause a minimal damage (e.g. away from critical components of airplane 100 and from people onboard) and/or in locations where environmental conditions are safer for storage of high pressure gas (e.g. in cold locations, in areas that suffer less mechanical impact, etc.).

While these and other precautionary means may be implemented, it should be noted that provisioning of high pressure fluids (and especially gas) is alternatively enabled using pumps and/or compressors rather than high pressure gas tanks (or for pressuring gas in tanks upon need). It is therefore noted that wherever high pressure tanks 256 are discussed, alternative implementations of utilizing one or more pumps or compressors for pressurizing of fluid to be used instead of the equivalent gas from the high pressure tanks 256, may be considered.

Other means other than high-pressure tasks 1256 storing high-pressure gas may also be used for the jetting of fluid using high pressure gas. According to an embodiment of the invention, gas may be pressured onboard the vehicle, e.g. by a compressor, by utilization of explosives, etc. For example, when a jetting is triggered, a signal may be sent to a high pressure gas provisioning unit of jetting system 250, wherein an igniter would start a rapid chemical reaction generating high pressure gas (e.g. nitrogen N2). The reaction may include ignition of energetic propellant or an explosive material.

The ignition of the chemical reaction may be accompanied by breaching a barrier that separates (prior to its breaching) between the high pressure gas provisioning unit to the corresponding jetting system container 1254—but such a barrier is not necessarily implemented. The gas so pressured, according to such an embodiment of the invention, may provide at least some (and possibly all, or substantially all) of the pressure required for the jetting of a high pressure jet that includes water from the respective jetting system container 1254.

Referring again to the connection between any of the jetting system containers 254 and the gas tanks 256, it should be noted that according to an embodiment of the invention, any gas-transmission-permitting connection between each of the at least one jetting system container 254 and its corresponding high pressure tank 256 (i.e. the tank 256 connected to said container 254, e.g. as described above) is blocked (for example by faucet or explosible plug 266) during the first period (which is the period during at least which the water permitting connection between that container 254 and the fresh water system 130 permits transmission of water—if such connection is indeed implemented).

Generally, in some embodiments of the invention, transmission of high pressure gas to any container 254 is prevented while the latter is hydraulically connected to the fresh water system 130 of airplane 100 (or to another hydraulic system thereof), e.g. in order to protect the fresh water system 130 from the high pressure that it is not designed for, and in order to concentrate the high pressure towards exiting via a connected nozzle 252 of jetting system 250 and not to be wasted via undesired and ineffective expansion to spaces of said airplane's hydraulic system.

In some embodiments of the invention, any hydraulic connection between each of the at least one jetting system container 254 and a fresh water supply 130 of airplane 100 is blocked prior to the jetting of the high pressure jet and during the jetting. Such a hydraulic connection between at least one jetting system container 254 and the fresh water supply 130 may be, by way of example, a faucet 264.

According to an embodiment of the invention, that blocked connection may be selectively opened in response to a command issued by processor 220. Such a command may be issued directly before jetting—e.g. in response to analysis of the detection information that indicates detection of the bird, and may also be issued regardless of such detection (and even substantially before it), e.g. after the jetting system containers 256 are sufficiently filled. It should be noted that in some embodiments of the invention such blocking may be reinstituted, but this is not necessarily so. Additionally, in some embodiments in which multiple high pressure tanks 256 are connected to one (or more) jetting system container 256—it should be noted that not all of these connections are necessarily selectively opened concurrently, and that some connections may be blocked while others are opened.

Once the blocking between a high pressure gas tank and a respective container 254 is opened, the pressure in that container 254 increases substantially. Conveniently, such pressure is maintained (possibly even increased, if connecting to additional tanks 256) prior to the jetting, e.g. by having no connection permitting transmission of fluid to large spaces of lower pressure (especially airplane spaces or open air, which are usually substantially of atmospheric pressure).

In such an embodiment of the invention, it will be clear to a person who is of skill in the art that aperture a nozzle 252 of jetting system 250 (or aperture a connection, such as optional faucet 262, between the nozzle 252 and the container 254 to which it is connected)—having its external side located in substantially lower pressure (e.g. atmospheric pressure)—would result in jetting of a high pressure jet from that nozzle (given that an aperture of the nozzle is not exceedingly large). Sizes of the aperture of nozzles 252 in various embodiments of system 200 may vary, but are usually less than 1 cm or 2 cm, and may be effectively sized as a few millimeters (mm) apertures, e.g. 1 mm, 2 mm, 3 mm, etc. According to an embodiment of the invention, all the apertures of nozzles 252 that are used for jetting high pressure jets by jetting system 250 are smaller in their longest dimension than 5 mm. According to an embodiment of the invention, an aperture size of any nozzle that is used by jetting system 250 for the jetting of the high pressure jet is smaller than 4 millimeters.

It should be noted that aperture size of at least one of the nozzles may be substantially larger than 4 mm. By way of example, according to an embodiment of the invention, the shape of an aperture of such a nozzle may be of elongated shape, e.g. having a length of over 1 cm, and a width of less than 1 mm. in another example, a size of the aperture of the nozzle may be substantially larger than 4 mm (e.g. diameter of 1 cm, a 5×10 mm$^2$ rectangle), wherein the aperture may be selectively shut to different degrees by a matching shutter.

It should be noted that in some embodiments of the invention—and for various reasons—a single jet may be designed to be jetted from multiple nozzles 252 (connected to a single container 254, or to more than one container). In such embodiments of the invention (though not necessarily in such embodiments), the aperture of nozzles 252 in jetting system 250 may be submillimetric.

The size of nozzle apertures is but one of the factors which affect the effective distance of the jetted high pressure jet. Another factor is the number of the one or more nozzles 252 participating in the jetting of that jet, as well as nozzle geometry of these one or more nozzles 252 (especially of their apertures, but not necessarily exclusively). Other factors that substantially influence the effective distance of the jet is the pressure of the fluid jetted, and the hydraulic efficiency of the hydraulic system used for transmission of fluid from the container 254 to the nozzle 256. Other substantial factors include, among others, fluidal properties of the jetted fluid such as viscosity, surface tension, density, etc. as well as dynamical parameters of the airplane such as velocity. It will be clear to a person who is of skill in the art that this list does not exhaust the substantial influencing factors, and is only presented for illustrative purposes.

It is also clear that the effective distance of a high pressure jet may be measured in different ways. The effectiveness of the jet primarily depends on what is its desired effect—which may be different in different embodiments of the invention. The principal goal of reducing damage by birds to airplane 100 may be achieved using one or more high pressure jets in various ways. For example, the jet may be used for forcing the bird away, either preventing a collision of the bird and the airplane, or resulting in collision in a less sensitive part of the airplane. Another way of achieving said principal goal is by smashing the bird with the jet—resulting in multiple pieces of substantially smaller size (compared to the previously whole bird) which are far less hazardous to the airplane. A combination of these effects may also occur.

According to an embodiment of the invention, jetting system 250 is operable to jet the high pressure jet to an effective distance of at least 3.5 meters (3.5 m) from at least one nozzle 252 out of which the high pressure jet is jetted. Other effective distances may be defined for different scenarios and implemented systems 200, e.g. 2 m, 5 m, 7 m, 10 m, 15 m, 20 m, and even above, especially for relatively larger airplanes.

As aforementioned, the effective distance may be defined in various ways—e.g. depending on the component of airplane 100 that is protected by a jet. For example, according to one definition hit of the bird by the high pressure jet at a distance smaller than the effective distance results in forcing the bird away from an engine of the airplane (or, additionally or alternatively, in smashing thereof).

In various embodiments of the invention and depending—among other parameters—on the characteristics of the high pressure jet—the hitting of the bird (e.g. weighing over 3 Kg) may result in causing a displacement of the bird by some 4 m or more away from a body of the airplane.

According to another group of definitions, the effective distance may be defined by hydrodynamic characteristics of the high pressure jet. For example, according to an embodiment of the invention, at any distance smaller than the effective distance, water velocity (or fluid velocity if other fluid is used) in a core of the high pressure jet is higher than 50 m·s−1 (or other velocity threshold in other implementations, e.g. 30 m·s$^{-1}$, 70 m·s$^{-1}$, 90 m·s$^{-1}$, 150 m·s$^{-1}$, etc.).

It should be noted that the core of the high pressure jet is not necessarily in its center and/or its axis of symmetry (if applicable). The core may also pertain to a locus in which most of the jetted fluid flows in the jet. In some implementations, for example, the very center of the high pressure jet (or even a locus that contains that center) may not be the part of the high pressure jet in which the flow is most vibrant (in at least some parts along the course of the high pressure jet), in which case the core may be considered to be a locus that does not wholly contain the center of the jet.

In another example, according to an embodiment of the invention, at any distance smaller than the effective distance, water velocity (or fluid velocity if other fluid is used) in a core of the high pressure jet is about 280 m·s−1 (e.g. between 250 m·s−1 and 300 m·s−1).

It should be noted that in order to force bird 10 away from airplane 100 (or at least from its engine 110 or other highly vulnerable component of it), sufficient kinetic energy should be transmitted from the high pressure jet to the bird, increasing its momentum in a direction away from the airplane. Kinetic energy should also be transmitted to the bird in order to disintegrate it, according to some embodiments of the invention.

Given the above, it should be noted that in such embodiments of the invention, stopping or slowing down of the bird 10 with respect to airplane 100 is not at all required or achieved by the operation of system 200. On the contrary, in some embodiments of the invention and in some scenarios, the jetting of the high pressure jet may even cause an increase in the speed of the bird 10 with respect to airplane 100. Clearly, processor 220 may be configured to determine activation parameters enabling such a jetting by the jetting system.

According to an embodiment of the invention, jetting system 250 may be operable to jet the high pressure jet onto the bird for transferring kinetic energy to the bird. According to an embodiment of the invention, jetting system 250 is operable to increase the kinetic energy of the bird by jetting the high pressure jet onto the bird. Clearly, processor 220 may be configured to determine activation parameters enabling such a jetting by the jetting system.

According to an embodiment of the invention, jetting system 250 may be operable to jet the high pressure jet onto bird 10, hitting the bird at an angle of less than 40° from an axis perpendicular to a progression direction of the bird with respect to the airplane at the time of the hit. Hitting in such angles may result in an efficient transfer of the kinetic energy of the high pressure jet to the bird 10, resulting in the forcing away of bird 10 from airplane 100 and/or in disintegration thereof.

According to an embodiment of the invention, during at least part of the time of the hitting of bird 10 with the high pressure jet, jetting system 250 hit the bird 10 with the high pressure jet at an angle of less than 20° from the formerly identified axis, and even at an angle of less than 5° (if not directly parallel to that axis).

One of the substantial parameters which may also influence the effective distance of the high pressure jet (as well as other properties of which, such as effective power, duration, etc.) is the amount of water (or other jetted fluid) jetted. According to an embodiment of the invention, jetting system 250 is operable to jet the high pressure jet that consumes between 30 and 150 liters of water (or whichever fluid, especially liquid, that is jetted). The amount of water consumed by jets in some embodiments of the invention may be from the lower part of that range (e.g. 30-50 liters) while others may be from a middle or higher part of that range (e.g. 50-100 or 100-150 liters). It will be clear to a person who is of skill in the art that in some implementations, the amount of water consumed for the jetting of a high pressure jet may exceed 150 liters of water, or be less than 30 liters. A person who is of skill in the art would understand that these numbers are given by way of example only, and that the actual numbers have to be adjusted for the implemented system.

Clearly, different jets that are jetted by a single jetting system 250 do not necessarily consume a uniform amount of water—e.g. resulting from a determination by processor 220, as a result of different geometry or mechanical characteristics of different portions of the jetting system (e.g. different types of nozzles) or fluctuating temporary state of the system (e.g. the amount of water available in the fresh water system 130).

Also—not all the water consumed for the jetting of a high pressure jet may actually constitute part of that jet (e.g. due to losses), and the jet may also include material apart from the water consumed (e.g. pressurized gas, added polymers, etc.).

A duration of each of the at least one high pressure jet is also determined by a wide variety of factors, such as these discussed above (e.g. pressure of the pressurized gas, amount of fluid jetted, geometry of nozzles), and various durations may be implemented in various embodiments of the invention.

For example, according to an embodiment of the invention any high pressure jet that is jetted by jetting system 250 is jetted for an effective duration of less than 20 milliseconds. Similarly to the effective distance of the jet, it is clear that the effective duration of a high pressure jet may be measured in different ways. As noted above, the effectiveness of the jet primarily depends on what is its desired effect—which may be different in different embodiments of the invention. In an example, the effective duration of a jetting may be defined as duration in which water velocity (or velocity of equivalent fluid used for the jetting) in a core of the high pressure jet exceeds 50% of the highest water velocity in the core of that jetting. However, as will be clear to a person who is of skill in the art, other definitions may also be applied. For example, another definition for the effective duration of the jet may be the duration during which jet may be used for achieving a defined goal for a desired effective distance (such as 3.5 m). Such a definition may be, by way of example, that hitting of the bird by the high pressure jet at a distance smaller than the effective distance and during its effective duration results in forcing the bird away from an engine 110 of airplane 100 (or from other identified component thereof).

As was discussed above—in some embodiments of the invention, jetting system 250 may be operable to jet multiple high pressure jets—either in different times and/or at least partly concurrently. Jetting of multiple jets may be used for different ends, such as—jetting toward different birds at different times, covering a wide area (e.g. by jetting a "curtain" of jets, e.g. as exemplified in FIG. 2F), for countering a flock of birds, etc. It will therefore be clear that processor 220 may be further configured in some embodiments of the invention to determine activation parameters for multiple jetting instances of the jetting system.

As discussed above, a few examples of activation parameters that may be determined by processor 220 in various embodiments of the invention (e.g. in response to its analysis of detection information, in response to airplane information, in response to a condition of system 200, and any combination thereof) are: desired direction of jetting; identity of one or more nozzles that should participate in the jetting; number and timing of multiple jets to be jetted; amount of water and/or pressure thereof for the high pressure jet; and prerequisite activities that should be performed prior to the jetting.

An example of a scenario in which processor 220 may determine activation parameters for multiple high pressure jets is an encounter of airplane 100 with a flock of birds. According to an embodiment of the invention, processor 220 may be further configured to determine the activation parameters for the multiple jetting instances in response to detection information that is received from the at least one detector 210 and which is indicative of detection of multiple birds at least partly concurrently.

As aforementioned, jetting of multiple jets may be implemented—if at all—at different times, but may also be carried out at least partly concurrently. According to an embodiment of the invention, jetting system 250 is operable to concurrently jet from multiple nozzles 252 of the jetting system multiple high pressure jets, of which at least one is jetted onto the bird. If a curtain of jets is implemented—a configuration in which jets are jetted at least partly concurrently so that distances between the jets across an area of interest (e.g. a cross section of said imaginary truncated cone in front of an engine 110) are sufficiently small to achieve sufficiently high probability of hitting a bird that crosses that area of interest. Clearly—the closer the jets to each other across the area of interest the higher the probability of hitting the bird, but the cost in terms of energy, jetted fluid and system complexity is also higher.

Utilizing such a curtain configuration reduces or diminishes the need to implement solutions for steering the jet (e.g. by steering of the nozzles 252 themselves). It should be noted that even if a configuration suitable for a curtain solution is implemented, not necessarily all of the nozzles 252 in such a configuration should be used in every instance of jetting (thus achieving the widest curtain possible for such a configuration); in other instances only one or a few of the nozzles may be used for jetting. Even if only one jet is jetted at a time, the need for steering is nevertheless reduced, as there is a wider selection of possible nozzles 252 utilizable for the jetting of that single jet to select from.

It should be noted that apart from affecting the bird, an activation of the jetting system may have different possible effects on airplane 100 in different embodiments of the invention. For example, depending on the shape and weight distribution of airplane 100 and on the thrust and location of the high pressure jet, the jetting may have implication on momentum of airplane 100. By way of example, jetting from a nose dome of airplane 100 to the side may cause a greater interference in a course of airplane 100 when compared to jetting of a similar jet from a part of the body of airplane 100 that is closer to the wing.

According to an embodiment of the invention, an effect of the activation of jetting system 250 on flight behavior of the airplane is unnoticeable to people onboard airplane 100 (e.g. pilots, aircrew, passengers). According to an embodiment of the invention, an effect of the activation of jetting system 250 does not require compensation by any flight control surface of airplane 100.

Regardless of whether a pilot or an airplane system is sufficiently sensitive to sense the effects of the jetting, an alert may be issued by system 200 to the pilot and/or to a system of airplane 100. According to an embodiment of the invention, processor 220 is further configured to issue, following the analysis, an alert to an external airplane system indicating that a jetting by the jetting system occurred (wherein it should be noted that alerting the pilot would generally be carried out by an airplane system connected to system 200, and not by system 200 itself).

Figure 4A:
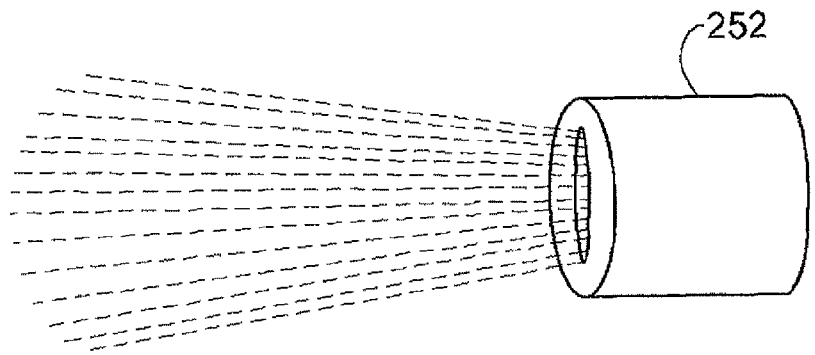
FIGS. 4A through 4C illustrate various possible jets that may be jetted by a jetting system, according to various embodiments of the invention.
Figure 4B:
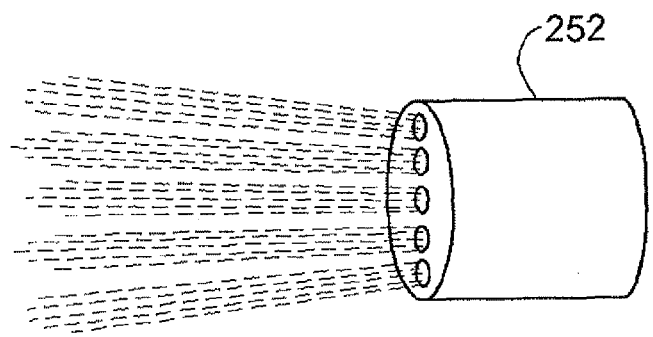
Figure 4C:
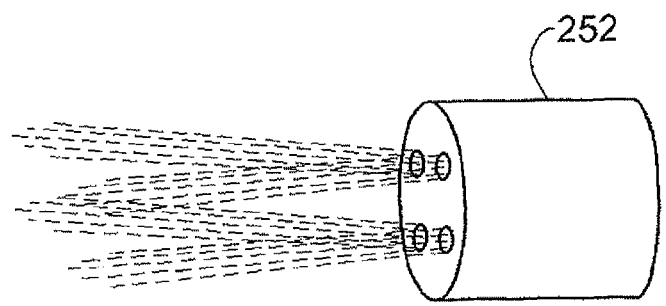

FIGS. 4A through 4C illustrate various possible jets that may be jetted by jetting system 250, according to various embodiments of the invention. It can be seen that the number and shape of nozzles 252 used for the jetting of each high pressure jet affect the shape of that jet.

Figure 5A:
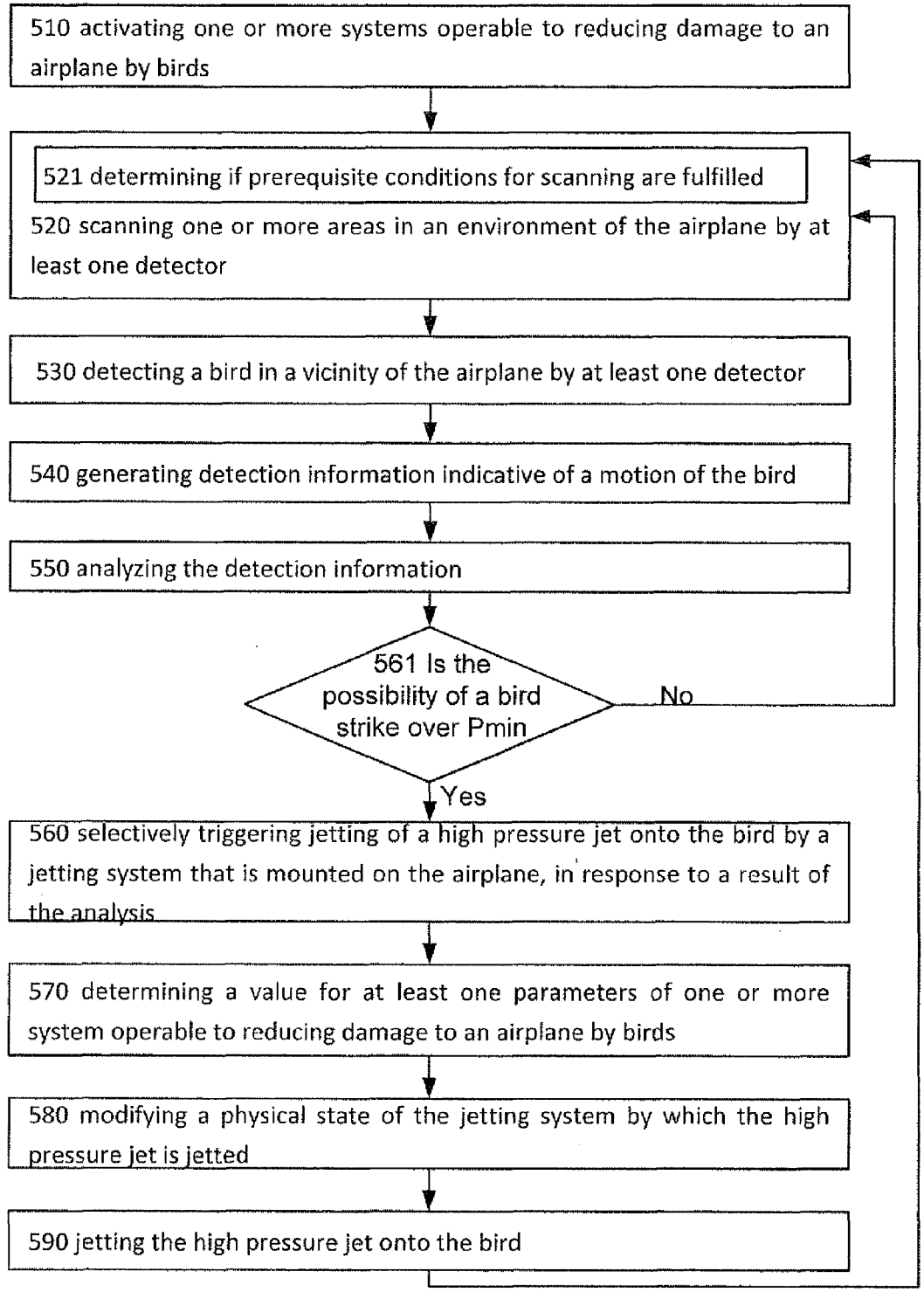
FIG. 5A is a flow chart of a method for reducing damage by birds to an airplane, according to an embodiment of the invention.

FIG. 5A illustrates method 500 for reducing damage to an airplane by birds, According to an embodiment of the invention. Referring to the examples set forth in the previous drawings, it should be noted that method 500 may be carried out by a system such as system 200. It should be noted that various embodiments of the invention that were discussed in relation to system 200 would be readily implementable by a person who is skilled in the art also as embodiments of method 500 (and vice versa), even if not explicitly elaborated.

Method 500 may start with stage 510 of activating one or more systems operable to reduce damage to an airplane by birds (e.g. by carrying out at least one stage of method 500). Especially, the activating may include activating a system for reducing damage to an airplane by birds. Referring to the examples set forth in the previous drawings, stage 510 may be carried out by a system such as system 200. Stage 510 may include, by way of example, initiating such a system, modifying an activity state of such a system, and so forth. A more detailed view of possible implementations of stage 510 is provided in FIG. 5B.

Method 500 may include stage 520 of scanning one or more areas in an environment of the airplane by at least one detector. It should be noted that, according to some embodiments of the invention, at least one of the detectors that participate in the scanning of stage 520 is mounted on the airplane, and that in many implementations (though not necessarily so), all of the one or more detectors that participate in the scanning of stage 520 are mounted on the airplane. Referring to the example set forth in the previous drawings, stage 520 of scanning may be carried out by one or more detectors such as detectors 210.

It should be noted that the scanning of stage 520 may be carried out in different manners, e.g. depending on the characteristics of the detector that carries out the scanning. For example, the scanning may be done by a scanning beam (e.g. optical, acoustical) which is relatively narrow (when compared to the solid angle subtended by a detection area of the detector in relation to the location of the detector) that scans across the detection area (e.g. as in a LIDAR detector). In other embodiments, the scanning may be carried out by a starring detector that covers a fixed area (e.g. a video camera, and IR camera), and so forth. It should be noted that if more than one detector is implemented, detection areas (also referred to as "coverage areas") of different detectors may—and may not—overlap each other.

It should be noted that not necessarily all (or any) of the one or more detectors actively scan the environment of the airplane at all times. For example, method 500 may include activating of a relatively accurate detector (e.g. with very high spatial and/or temporal resolution) in response to the detection results of another detector (e.g. having a larger detection range or lower energetic requirements). For example, method 500 may include stage of selectively activating (and/or deactivating) one or more of the detectors that participate in the scanning—e.g. in response to a command issued by a pilot, an airplane system, an airfield system, and the like, and/or in response to a state of the jetting system, of the detectors, and so forth. According to an embodiment of the invention method 500 may include issuing an alert to an external airplane system indicating that a jetting by the jetting system occurred, wherein the issuing is carried out after the analyzing.

According to an embodiment of the invention, the carrying out of the scanning of stage 520 may depend on the results of stage 521 of determining if prerequisite conditions for scanning are fulfilled. For example, the determining of stage 521 may include determining if a condition associated with any of the above exemplified parameters occurred (e.g. a command was received, a jetting system is not functional, etc.). The determining of stage 521 may also include, by way of example, checking if a velocity of the airplane is above a minimal velocity threshold (e.g. which characterize a state of flight when compared to taxi driving, for example), wherein the scanning of stage 520 is only carried out if the velocity of the airplane exceeds the aforementioned minimal velocity threshold.

It should be noted that the checking of any of the above identified conditions and states may be carried out directly (e.g. measuring water level in a container of the jetting system) or indirectly (e.g. assessing height by measuring ambient air pressure).

It should be noted that in various implementations of the invention, the scanning may be the longest stage of all the stages of method 500. In most expected flight conditions, a detection of a bird may last for several seconds and at most under a minute, while the flight may well exceed an hour or more. Depending on the embodiment of the invention, the scanning may be continued for detection (e.g. in order to detect additional information required for the jetting, and/or for keep looking for other birds), and even after detection of one or more birds, e.g. in stage 530. Continuation of the stage of detection may be unnecessary, for example, if the system implementing method 500 has only sufficient resources to handle a single case of bird detection—or after determining that remaining resources are no longer sufficient for jetting (even if the system may handle more than one jetting).

Method 500 may include stage 530 of detecting a bird in a vicinity of the airplane by at least one detector, wherein according to an embodiment of the invention the detecting of stage 530 may include detecting by at least one detector that is mounted on the airplane. Referring to the examples set forth in the previous drawings, stage 530 may be carried out by any one or more detectors 210. It should be noted that the detecting does not necessarily mean that the detector that detected the bird is aware in any way that detection was made. The detector in such a situation may just keep providing information that results from the scanning, but the information that is provided is sufficient to another unit (e.g. a processor such as processor 220) to determine that an object is detected. Clearly, in other implementations the detector may at least partly analyze the information it generates, and determine when this information requires modification of its state (e.g. by alerting another unit such as an external processor, by modifying the type of information it transmits to such entity, by modifying its state of scanning, and so forth).

It is further clear to a person who is of skill in the art that the computerized entities may follow predefined rules that are designed to enable proper reaction (e.g. by jetting of water) when a bird is detected. Such rules do not necessarily require that any component of the system would acknowledge detection of a bird, but only that the system as a whole could properly respond to such a scenario.

Optional stage 540 of method 500 includes generating detection information indicative of motion of the bird. It should be noted that the detection information generated in stage 540 may include any combination of a wide range of parameters in different embodiments of the invention. For example, the detection information may include information pertaining to one or more of the following parameters—current location of the bird (especially in relation to the airplane), future expected location of the bird, relative speed of the bird, size of the bird, and so forth. In case that more than one bird is detected, the detection information may pertain to each detected bird separately.

According to an embodiment of the invention, the generating of stage 540 may include generating the detection information by a detector mounted on the airplane (and which detects the bird), but this is not necessarily so. The generating may include generating the detection information by a detector remote from the airplane (e.g. located on another airplane or on the ground). According to an embodiment of the invention, stage 540 may be replaced with a stage of receiving from a system remote from the airplane the detection information that is indicative of the bird which is detected by a detector remote from the airplane (e.g. located on another airplane or on the ground). Referring to the examples set forth in the previous drawings, stage 540 may be carried out by a detector such as detector 210.

It should be noted that the detection information that is indicative of the motion of the bird is not necessarily distinguishable—without due processing—from other information that is provided by the detector (e.g. scanning information thereof). While the detector may provide in some embodiments of the invention information that is directly related to the motion of the bird (e.g. estimated location and direction thereof), it is not necessarily so, and in other embodiments such motion parameters may only be gathered by processing of another unit.

Method 500 may also include stage 550 of analyzing the detection information. Referring to the examples set forth in the previous drawings, stage 550 may be carried out by a processor such as processor 220. The analyzing of the detection information may be a part of an ongoing analysis of information provided regularly by one or more of the at least one detector. The analyzing of the detection information may also be a dedicated analysis indicated as highly relevant (e.g. when an object was detected)—which may exceed the scope of any routine analysis.

The analysis may take different forms in different implementations of the invention. It may include determination of parameter values in response to the detection information analyzed (such as kinetic parameters not previously known, jetting parameters for future jetting, and so forth), determining whether thresholds were crossed (e.g. proximity of the bird to the airplane), and so forth.

According to an embodiment of the invention, the analyzing may further include analyzing the detection information to determine an assessed potential of damage by the bird to an engine of the airplane (or to any other sensitive component thereof). The determination of the assessed potential of damage may relate to kinetic parameters only (e.g. that enable to assess likelihood of the bird hitting the engine) and may also be responsive to additional parameters (e.g. the potential of damage may depend on the size of the bird, on an operation status of the engine, and so forth).

Method 500 includes stage 560 (which may follow stage 550 in embodiments in which the latter is implemented) of selectively triggering jetting of a high pressure jet onto the bird by a jetting system that is mounted on the airplane. In embodiments of the invention in which analysis of detection result is implemented, the selective triggering of the jetting may be carried out in response to a result of the analysis. Referring to the examples set forth in the previous drawings, stage 560 may be carried out by a processor such as processor 220. It should be noted that while stage 560 may be implemented by the same one or more processors that carry out stage 550, this is not necessarily so. According to an embodiment of the invention, the selective triggering includes autonomously triggering the activation of the jetting system without receiving commands from any external system.

It should be noted that the selective triggering may be responsive to result of a determination of whether one or more conditions were fulfilled, which is represented in an example as stage 561 (which may be part of stage 560) of determining whether a possibility of damage excess a predetermined threshold. It would be clear to a person who is of skill in the art that various conditions may apply.

It should be noted that the selective triggering may be responsive to other events, and not necessarily to analysis of detection results. For example, according to an embodiment of the invention, the selective triggering may be carried out according to timing information, to altitude information, to instructions of another system, and so forth. In an exemplary implementation, the selective triggering may include recurring selective triggering of jetting of high pressure jets when the airplane is flying through an area which is considered susceptible to bird strikes, or in such altitudes.

Stage 560 may be followed by stage 590 of jetting the high pressure jet onto the bird. Referring to the examples set forth in the previous drawings, stage 590 may be carried out by a jetting system such as jetting system 250—and/or by any component of such system. It should be noted that the jetting of stage 590 is conveniently triggered by the triggering of stage 560.

As would be clear in view of the examples offered in relation to system 200, in various implementations of the invention—and in various specific scenarios—the jetting of the high pressure jet may take many different forms. For example, in some embodiments of the invention, multiple high pressure jets may be jetted—concurrently or serially, in response to the triggering of stage 560.

In some embodiments of the invention, stage 590 may be preceded by stage 580 of modifying a physical state of the jetting system by which the high pressure jet is jetted. It should be noted that in different implementations of the invention, the modifying may be carried out in different ways. Various physical states that may be modified, by way of example, are a direction of one or more nozzles of the jetting system, a pressure in one or more of its containers, a degree to which a faucet is opened, electronic power scheme, and so forth. A person who is of skill in the art would see that method 500 may also include modifying of a non-physical state of that jetting system—e.g. modifying a logical state of one of its logical components. Such modifications may correspond to physical modifications (e.g. when a faucet is closed, a corresponding flag bit in a logical component may be changed from 1 to 0), but this is not necessarily so.

It should also be noted that while the modifying of the physical (and/or non-physical) states in stage 580 is illustrated after stage 550 of analyzing, it is not necessary that stage 580 will indeed follow stage 550, and/or be responsive to any of it results.

Stage 580 may follow stage 570 of determining a value for at least one parameter of one or more systems operable to reduce damage to an airplane by birds (e.g. by carrying out at least one stage of method 500). Especially, stage 570 may include determining values for at least one jetting system parameter for the jetting system that is used in stage 590. Referring to the examples set forth in the previous drawings, stage 570 may be carried out by a processor such as processor 220. It should be noted that stage 570 is not necessarily implemented by a processor that carries out the analyzing of stage 550.

It should also be noted that while the determining of stage 570 is illustrated after stage 550 of analyzing, it is not necessary that stage 570 will indeed follow stage 550, and/or be responsive to any of it results. However, according to an embodiment of the invention, the determining of stage 570 may be responsive to one or more results of the analyzing of stage 550. The modifying of stage 580 may be carried out in response to at least one result of stage 570, but this is not necessarily so.

In an example, stage 570 may include determining a desired jetting direction in response to the result of the analysis, and stage 580 may include modifying a configuration of at least one nozzle that is used for the jetting of the high pressure jet prior to its jetting, wherein the modifying of the configuration is carried out in response to the desired jetting direction determined in that exemplary implementation of stage 570.

According to an embodiment of the invention, method 500 may include (e.g. as a part of stage 570) determining activation parameters for the jetting system in response to environmental-condition indicative-data that is indicative of at least one physical condition in an environment of the airplane.

According to an embodiment of the invention, method 500 may include determining activation parameters for multiple jetting instances of the jetting system.

According to an embodiment of the invention, method 500 may include (e.g. as part of stage 570) determining the activation parameters for the multiple jetting instances in response to detection information that is received from the detector and which is indicative of detection of multiple birds at least partly concurrently.

According to an embodiment of the invention, the jetting may include jetting the high pressure jet onto the bird from at least one nozzle that is located so that a distance between a wing of the airplane and the nozzle is shorter than a distance of the nozzle from a frontmost part of a nose of the airplane and than a distance of the nozzle from a rearmost part of the airplane.

According to an embodiment of the invention, the jetting may include jetting the high pressure jet onto the bird from at least one nozzle that is located so that a distance between a frontmost part of a nose of the airplane and the nozzle is shorter than 5% of a length of the airplane which is measured between the frontmost part of the nose of the airplane and a rearmost part of the airplane.

Various other possible implementations of the jetting stage will be discussed in further detail in relation to FIG. 5C.

Referring to stages 520, 530 and 540, it should be noted that in various embodiments of the invention, different types of detectors may carry out any one or more of these stages. For example, according to an embodiment of the invention, stage 530 of detecting may include detecting the bird by a detector that is a light detection and ranging (LIDAR) detector, which is operable to emit laser pulses and to detect the bird by detection of light reflected from the bird. A Few other types that may be used for stages 520, 530, and/or 540 are exemplified in relation to detector 210 of system 200, and include for example radar, video sensor, IR detector, and so forth).

FIG. 5B illustrates various possible stages that may be implemented as part of stage 510 of activating the one or more systems, according to various embodiments of the invention. It should be noted that while stages 511-514 are illustrated as part of stage 510, these stages are not necessarily carried out concurrently with this stage, and in some embodiments of the invention these stages may be carried out before, after, and/or independently therefrom.

According to an embodiment of the invention, method 500 may include stage 511 of arming one or more systems operable to reduce damage to an airplane by birds (e.g. by carrying out at least one stage of method 500). Stage 511 of arming may be carried out, by way of example—during or in preparation for takeoff of the airplane or its landing. In some scenarios, it may be part of checklist (e.g. a preflight planning dispatch checklist and/or a pre-landing checklist), and/or may be carried out automatically—e.g. as part of a preflight and/or pre-landing automatic sequence. It should be noted that a disarming of these one or more systems may also be carried out in similar fashion. It should be noted that a pilot (or other external airplane system) may have an overriding switch, which provides control in activation/arming state of the systems that implement method 500 or at least some of its stages.

According to an embodiment of the invention, method 500 may include stage 512 of testing an operational state of one or more systems operable to reduce damage to an airplane by birds (e.g. by carrying out at least one stage of method 500). The testing may be self-testing, but this is not necessarily so. It should be noted that different reactions may be implemented for different results of the testing—e.g. issuing an alert, changing a condition of a component, and so forth.

According to an embodiment of the invention, method 500 may include stage 513 of gaining control of airplane resources of one or more other systems of the airplane. Such resources may be for example electric power, water or other fluid to be jetted, communication, and so forth. The control gained may be of different degrees in different embodiments of the invention, and may include, for example, hydraulically connecting to fresh water supply of the airplane in order to fill containers of the jetting system.

According to an embodiment of the invention, method 500 may include stage 514 of selectively preventing triggering of the activation of the jetting system in response to received location information that is indicative of a location of the airplane. This may be used, for example, for selectively preventing triggering of the activation of the jetting system in low altitudes, in airfields, and so forth.

FIG. 5C illustrates various possible stages that may be implemented as part of stage 590 of jetting the high pressure jet onto the bird, according to various embodiments of the invention. It should be noted that while stages 591-596 are illustrated as part of stage 590, these stages are not necessarily carried out concurrently with stage 590, and in some embodiments of the invention these stages may be carried out before, after, and/or independently therefrom.

According to an embodiment of the invention, method 500 may include stage 591 of jetting onto the bird the high pressure jet that includes water from at least one jetting system container of water.

According to an embodiment of the invention, stage 591 may include jetting onto the bird the high pressure jet that includes water from at least one jetting system container of water that is hydraulically connected to a fresh water supply of the airplane for at least a first period between a takeoff of the airplane to the triggering of the jetting system, wherein a ratio between water pressure in any of the at least one jetting system container and water pressure of the fresh water supply is less than 1 to 2 at times of such a hydraulic connection (e.g. if the water pressure of the fresh water supply is about 1 atmosphere, the water pressure in any of the at least one jetting system container according to such an embodiment of the invention).

According to an embodiment of the invention, stage 591 may include stage 592 of jetting onto the bird the high pressure jet that includes water from at least one jetting system container of water that is connected to a corresponding high pressure tank that contains high pressured gas (e.g. at a pressure that exceeds 1,000 PSI). According to such an embodiment of the invention, method 500 may further include stage 593 of blocking any gas transmission permitting connection between each of the at least one jetting system container and its corresponding high pressure tank during the first period; and stage 594 of selectively aperture any of the at least one gas transmission permitting connection in response to a command (e.g. issued by a processor that carries out stage 550 of analyzing).

According to an embodiment of the invention, method 500 may include stage 595 of blocking any hydraulically connection between each of the at least one jetting system container and a fresh water supply of the airplane prior to the jetting of the high pressure jet and during the jetting.

According to an embodiment of the invention, stage 590 may be a part of a stage of concurrently jetting from multiple nozzles of the jetting system multiple high pressure jets, of which at least one jet is jetted onto the bird.

According to an embodiment of the invention, method 500 may include stage 596 of administering polymeric material, which is characterized by its usability for modifying surface tension of water, into jetting system container water, wherein stage 596 is carried out prior to the jetting of the high pressure jet.

According to an embodiment of the invention, the jetting may include jetting onto the bird the high pressure jet in a jetting direction so that an angle between the jetting direction and a progression direction of the airplane does not exceed 5°. In yet other configurations, the jetting may include jetting onto the bird the high pressure jet in a jetting direction so that an angle between the jetting direction and a progression direction of the airplane may be different—e.g. between 5°-10°, between 10°-20°, between 20°-30°, between 30°-40°, between 40°-50°, between 50°-60°, between 60°-70°, between 70°-80°, and any combination thereof.

According to an embodiment of the invention, the jetting may include jetting onto the bird the high pressure jet in a jetting direction so that an angle between the jetting direction and a progression direction of the airplane is between 80° and 100°. That angle may also be measured with respect to the longitudinal axis of the airplane. It should be noted that in such a scenario, an angle between the jetting direction and an imaginary line connecting wingtips of airplane need not be very large (unless protection of the tail or other specific components is required). It should be noted that measurement of the angle with respect to the longitudinal axis or to the progression direction of the airplane matters usually only in strong winds, wherein such directions may somewhat deviate one from the other.

In different implementations of method 500, one or more high pressure jets may be jetted in different settings and/or physical characteristics. For example, according to an embodiment of the invention, the jetting may include jetting the high pressure jet to an effective distance of at least 3.5 meters from at least one nozzle out of which the high pressure jet is jetted, wherein hit of the bird by the high pressure jet at a distance smaller than the effective distance results in forcing the bird away from an engine of the airplane. It is clear that other effective distances (e.g. as exemplified above in relation to system 200) may be used in other implementations of method 500.

Likewise, according to an embodiment of the invention, the jetting may include jetting the high pressure jet to an effective distance of at least 3.5 meters from at least one nozzle out of which the high pressure jet is jetted, wherein at any distance smaller than the effective distance, water velocity in a core of the high pressure jet is higher than 50 meters per second.

According to an embodiment of the invention, the jetting may include jetting the high pressure jet that consumes between 30 and 150 liters of jetted liquid (e.g. water, or water with additive added thereto). Clearly, in other implementations other amounts of jetted liquid may be used.

According to an embodiment of the invention, the jetting may include jetting of at least one high pressure jet so that any high pressure jet that is jetted by the jetting system during a single flight of the airplane is jetted for an effective duration of less than 20 milliseconds, wherein the effective duration of a jetting is a duration in which water velocity in a core of the high pressure jet exceeds 50% of the highest water velocity in the core of that jetting.

According to an embodiment of the invention, the jetting may include jetting the high pressure jet wherein an aperture size of any nozzle that is used by the jetting system for the jetting of the high pressure jet is smaller than 4 millimeters. Clearly, in other implementations other sizes may be used, e.g. as exemplified above in relation to system 200.

Referring to system 200, it should be noted that while system 200 may be operated as a whole, and designed as a single product, in some implementations a similar system may be an amalgamation or other combination of different systems or sub-systems that may be designed, manufactured and/or installed independently of each other. For example, a prior art detector may be implemented in some embodiments of the invention as the detector that provides detection information—and this detector may be even a detector that pre-exists in the airplane.

It is therefore made clear that different components and sub-systems of the disclosed system may be manufactured, designed, and/or installed independently of other components, and all are included within the scope of this disclosure.

In an example, processor 220 may be incorporated into a standalone unit (not illustrated), having some or all of the capabilities discussed in relation to being part of system 200. Such a standalone unit may include additional components such as casing, power supply, communication jacks, and so forth. Upon installation, for example, it may be connected to a previously unrelated detector, and/or to a jetting system installed in the airplane. Processor 220 may also be implemented, for example, on a processor previously installed in airplane 220, wherein such implementation may require an additional processing unit connected thereto, and/or software and/or firmware updates made to the airplane mounted processor.

Likewise, design and manufacture of a jetting system designed to jet high pressure jets onto birds during flight of the airplane do not necessarily have to be made with respect to any given processor and/or detector, and such jetting systems (or components thereof) may be designed, manufactured and/or installed onto an airplane independently of other components of system 200. Similar systems may be constituted for other components of system 200, e.g. detector 210.

Referring to the processor, it should be noted that either processor 220 and/or an equivalent processor of a standalone unit—both of which may be implemented by multiple connected processors—may be implemented as a computer readable medium, having computer readable code embodied thereto for reducing damage by birds to an airplane. Such computer readable code may include instructions that, when executed by one or more machines (e.g. processors), cause the one or more machines to perform a method for reducing damage to an airplane by birds.

Such a computer readable medium may be implemented in different ways according to different embodiments of the invention. For example, the computer readable medium may be implemented as any one of the following, or combinations thereof—tangible memory, volatile memory, non-volatile memory, magnetic disk, optical disk, flash memory, and so forth.

Thus, according to an embodiment of the invention, a program storage device that is readable by machine is disclosed, wherein the program storage device tangibly embodies a program of instructions executable by the machine to perform method for reducing damage to an airplane by birds including the steps of: (a) receiving detection information that was generated by a detector mounted on the airplane and which is indicative of motion of a bird detected by the detector in a vicinity of the airplane; (b) analyzing the detection information; and (c) selectively triggering jetting of a high pressure jet onto the bird by a jetting system that is mounted on the airplane, in response to a result of the analysis.

According to an embodiment of the invention, the instructions embodied in the program storage device for receiving include instructions for receiving the detection information that was generated by the detector that is a light detection and ranging (LIDAR) detector that is operable to emit laser pulses and to detect the bird by detection of light reflected from the bird.

According to an embodiment of the invention, the instructions embodied in the program storage device for analyzing further include instructions for analyzing the detection information to determine an assessed potential of damage by the bird to an engine of the airplane.

According to an embodiment of the invention, the program storage device may tangibly embody further instructions executable by the machine for issuing a command for modifying a state of a hydraulic connection between a fresh water supply of the airplane and at least one jetting system container of water that contains water used for the jetting onto the bird of the high pressure jet and which is hydraulically connected to the fresh water supply of the airplane for at least a first period between a takeoff of the airplane to the triggering of the jetting system.

According to an embodiment of the invention, the program storage device may tangibly embody further instructions executable by the machine for selectively issuing a command to open any of at least one gas transmission permitting connection between at least one jetting system container that contains water used for the jetting onto the bird of the high pressure jet and its corresponding high pressure tank.

According to an embodiment of the invention, the program storage device may tangibly embody further instructions executable by the machine for determining a desired jetting direction in response to the result of the analysis, and for issuing a modification command instructing a jetting system component to modify a configuration of at least one nozzle prior to the jetting of the high pressure jet in response to the desired jetting direction.

According to an embodiment of the invention, the program storage device may tangibly embody further instructions executable by the machine for issuing an alert to an external airplane system indicating that a jetting by the jetting system occurred, wherein the issuing is carried out after the analyzing.

According to an embodiment of the invention, the program storage device may tangibly embody further instructions executable by the machine for selectively preventing triggering of the activation of the jetting system in response to received location information that is indicative of a location of the airplane.

According to an embodiment of the invention, the program storage device may tangibly embody further instructions executable by the machine for determining activation parameters for the jetting system in response to environmental-condition indicative data that is indicative of at least one physical condition in an environment of the airplane.

According to an embodiment of the invention, the program storage device may tangibly embody further instructions executable by the machine for determining activation parameters for multiple jetting instances of the jetting system.

According to an embodiment of the invention, the program storage device may tangibly embody further instructions executable by the machine for determining the activation parameters for the multiple jetting instances in response to detection information that is received from the detector and which is indicative of detection of multiple birds at least partly concurrently.

According to an embodiment of the invention, the instructions embodied in the program storage device for selective triggering may include instructions for autonomously triggering the activation of the jetting system without receiving commands from any external system.

Unless specifically stated otherwise, as apparent from the following discussions, it is appreciated that throughout the specification discussions utilizing terms such as "processing", "calculating", "determining", "generating", "setting", "configuring", "selecting", or the like, refer to the actions and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, for example, as described in the subject matter of the present application. The computer may enable the teachings of the subject matter of the present invention either by being specially constructed for the desired purposes or by being a general purpose computer configured for the desired purpose by a computer program stored in a computer readable storage medium.

Figure 6:
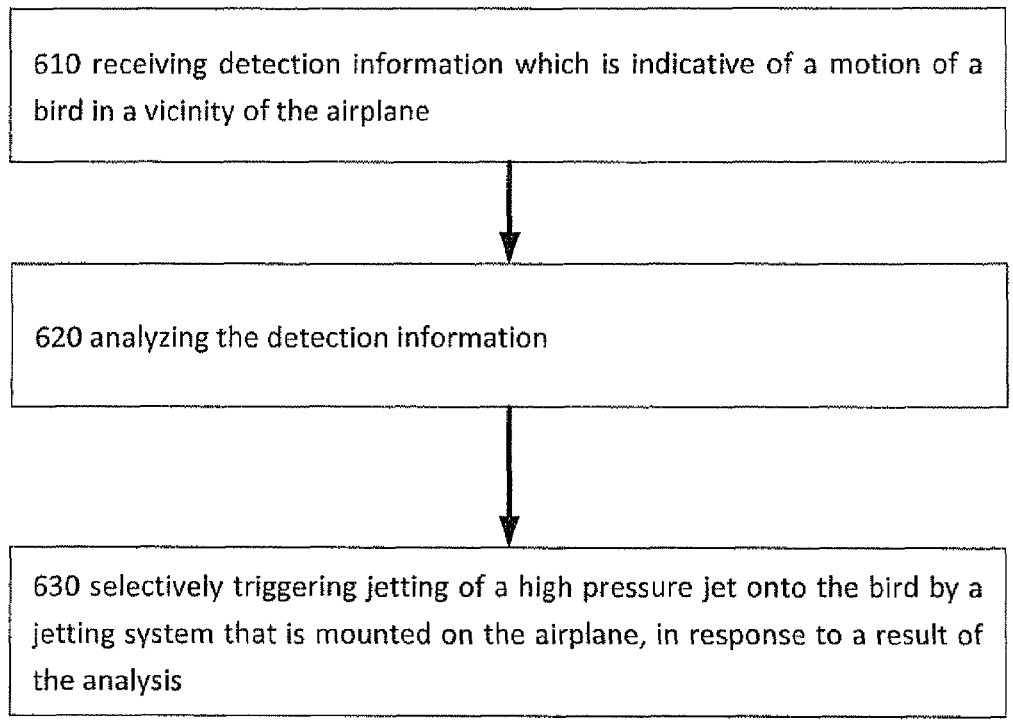
FIG. 6 is a flow chart of a method for reducing damage by birds to an airplane, according to an embodiment of the invention.

FIG. 6 illustrates method 600 for reducing damage to an airplane by birds, According to an embodiment of the invention. Referring to the examples set forth in the previous drawings, method 600 may be carried out by a processor such as processor 220. However, it should be noted that method 600 may also be carried out by any group of one or more processors that do not necessarily form a part of a system such as system 200. It would however be clear to a person who is of skill in the art that some implementations and variations previously disclosed in relation to method 500 and/or to system 200 (and especially to processor 220) may be implemented—mutatis mutandis—in method 600, even if not explicitly elaborated.

Method 600 may include stage 610 of receiving detection information which is indicative of motion of a bird detected in a vicinity of the airplane. According to an embodiment of the invention, the receiving of stage 610 may include receiving the detection information which was generated by a detector mounted on the airplane (and which detected the bird), but this is not necessarily so. The receiving may include receiving of detection information indicative of the bird which is detected by a detector remote from the airplane (e.g. located on another airplane or on the ground).

Method 600 may include stage 620 of analyzing the detection information.

Stage 630 of method 600 (which may follow stage 620, in embodiments of the invention in which it is implemented) includes selectively triggering jetting of a high pressure jet onto the bird by a jetting system that is mounted on the airplane. In embodiments of the invention in which stage 620 is implemented, the selective triggering of stage 630 may be carried out in response to a result of the analysis.

According to an embodiment of the invention, stage 610 of receiving may include receiving the detection information that was generated by the detector that is a light detection and ranging (LIDAR) detector that is operable to emit laser pulses and to detect the bird by detection of light reflected from the bird.

According to an embodiment of the invention, stage 620 of analyzing may include analyzing the detection information to determine an assessed potential of damage by the bird to an engine of the airplane.

According to an embodiment of the invention, method 600 may further include issuing a command for modifying a state of a hydraulic connection between a fresh water supply of the airplane and at least one jetting system container of water that contains water used for the jetting onto the bird of the high pressure jet and which is hydraulically connected to the fresh water supply of the airplane for at least a first period between a takeoff of the airplane to the triggering of the jetting system.

According to an embodiment of the invention, method 600 may further include selectively issuing a command to open any of at least one gas transmission permitting connection between at least one jetting system container that contains water used for the jetting onto the bird of the high pressure jet and its corresponding high pressure tank.

According to an embodiment of the invention, method 600 may further include determining a desired jetting direction in response to the result of the analysis, and issuing a modification command instructing a jetting system component to modify a configuration of at least one nozzle prior to the jetting of the high pressure jet in response to the desired jetting direction.

According to an embodiment of the invention, method 600 may further include issuing an alert to an external airplane system indicating that a jetting by the jetting system occurred, wherein the issuing is carried out after the analyzing.

According to an embodiment of the invention, method 600 may further include selectively preventing triggering of the activation of the jetting system in response to received location information that is indicative of a location of the airplane.

According to an embodiment of the invention, method 600 may further include determining activation parameters for the jetting system in response to environmental-condition indicative-data that is indicative of at least one physical condition in an environment of the airplane.

According to an embodiment of the invention, method 600 may further include determining activation parameters for multiple jetting instances of the jetting system.

According to an embodiment of the invention, method 600 may further include determining the activation parameters for the multiple jetting instances in response to detection information that is received from the detector and which is indicative of detection of multiple birds at least partly concurrently.

According to an embodiment of the invention, the selective triggering may include autonomously triggering the activation of the jetting system without receiving commands from any external system (e.g. intervention of an external system or of a pilot intermediated by such system).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

What is claimed is:

1. A method for reducing damage to an airplane by birds, the method comprising selectively triggering jetting of a high pressure jet onto a bird by a jetting system that is mounted on the airplane.

2. The method according to claim 1, further comprising receiving detection information which is indicative of motion of the bird which is detected in a vicinity of the airplane; and analyzing the detection information; wherein the selective triggering comprises selectively triggering the jetting of the high pressure jet onto the bird in response to a result of the analysis.

3. The method according to claim 2, wherein the receiving comprises receiving the detection information that was generated by a detector mounted on the airplane.

4. The method according to claim 2, further comprising issuing a command for modifying a state of a hydraulic connection between a fresh water supply of the airplane and at least one jetting system container of water that contains water used for the jetting onto the bird of the high pressure jet and which is hydraulically coupled to the fresh water supply of the airplane for at least a first period between a takeoff of the airplane to the triggering of the jetting system.

5. The method according to claim 2, further comprising selectively issuing a command to open any of at least one gas transmission permitting coupling between at least one jetting system container that contains water used for the jetting onto the bird of the high pressure jet and its corresponding high pressure tank.

6. A method for reducing damage to an airplane by birds, the method comprising:
   detecting a bird in a vicinity of the airplane by a detector that is mounted on the airplane;
   generating detection information indicative of motion of the bird;
   analyzing the detection information; and
   selectively triggering jetting of a high pressure jet onto the bird by a jetting system that is mounted on the airplane, in response to a result of the analysis.

7. The method according to claim 6, wherein the analyzing further comprises analyzing the detection information to determine an assessed potential of damage by the bird to an engine of the airplane.

8. The method according to claim 6, further comprising jetting of the high pressure jet onto the bird from at least one nozzle that is located so that a distance between a wing of the airplane and the nozzle is shorter than a distance of the nozzle from a frontmost part of a nose of the airplane and than a distance of the nozzle from a rearmost part of the airplane.

9. The method according to claim 6, further comprising jetting onto the bird the high pressure jet that comprises water from at least one jetting system container of water, and administering polymeric material, which is characterized by its usability for modifying surface tension of water, into jetting system container water prior to the jetting of the high pressure jet.

10. The method according to claim 6, further comprising jetting onto the bird the high pressure jet that comprises water from at least one jetting system container of water that is hydraulically coupled to a fresh water supply of the airplane for at least a first period between a takeoff of the airplane to the triggering of the jetting system, wherein a ratio between water pressure in any of the at least one jetting system container and water pressure of the fresh water supply is less than 1 to 2 at times of such a hydraulic coupling.

11. The method according to claim 6, further comprising jetting onto the bird the high pressure jet that comprises water from at least one jetting system container of water that is coupled to a corresponding high pressure tank that contains high pressured gas in a pressure that exceeds 1,000 pounds per square inch (PSI); blocking any gas transmission permitting coupling between each of the at least one jetting system container and its corresponding high pressure tank during the first period; and selectively aperture any of the at least one gas transmission permitting coupling in response to a command issued by the processor.

12. The method according to claim 6, further comprising determining activation parameters for multiple jetting instances of the jetting system.

13. The method according to claim 12, further comprising determining the activation parameters for the multiple jetting instances in response to detection information that is received from the detector and which is indicative of detection of multiple birds at least partly concurrently.

14. A system for reducing damage by birds to an airplane, the system comprising:
   a detector mounted on the airplane, operable to detect a bird in a vicinity of the airplane and to generate detection information indicative of motion of the bird;
   a processor, coupled to the detector, configured to analyze the detection information and to selectively trigger activation of a jetting system that is mounted on the airplane in response to a result of the analysis; and
   the jetting system, operable to jet a high pressure jet onto a bird.

15. The system according to claim 14, wherein the detector is an optical detector, operable to detect the bird by detection of light reflected from the bird.

16. The system according to claim 14, wherein the detector is a light detection and ranging (LIDAR) detector, operable to emit laser pulses and to detect the bird by detection of light reflected from the bird.

17. The system according to claim 14, wherein the processor is further configured to analyze the detection information to determine an assessed potential of damage by the bird to an engine of the airplane, and to selectively trigger the activation of the jetting system in response to a result of the analysis.

18. The system according to claim 14, wherein a distance between a wing of the airplane and a nozzle of the jetting system used for the jetting of the high pressure jet is shorter than a distance of the nozzle from a frontmost part of a nose of the airplane and than a distance of the nozzle from a rearmost part of the airplane.

19. The system according to claim 14, wherein a distance between a frontmost part of a nose of the airplane and a nozzle of the jetting system used for the jetting of the high pressure jet is shorter than 5% of a length of the airplane which is measured between the frontmost part of the nose of the airplane and a rearmost part of the airplane.

20. The system according to claim 19 wherein the at least one jetting system container of water is hydraulically coupled to a fresh water supply of the airplane for at least a first period between a takeoff of the airplane to the triggering of the jetting system, wherein a ratio between water pressure in any of the at least one jetting system container and water pressure of the fresh water supply is less than 1 to 2 at times of such a hydraulic coupling.

21. The system according to claim 19, wherein each of the at least one jetting system container is coupled to a corresponding high pressure tank that contains high pressured gas in a pressure that exceeds 1,000 pounds per square inch (PSI), wherein any gas transmission permitting coupling between each of the at least one jetting system container and its corresponding high pressure tank is blocked during the first period and is selectively opened in response to a command issued by the processor.

22. The system according to claim 14, wherein the jetting system comprises at least one jetting system container of water, wherein the jetting system is operable to jet onto the bird the high pressure jet that comprises water from the at least one jetting system container.

23. The system according to claim 22, wherein at least one component of the jetting system is operable to administer polymeric material, which is characterized by its usability for modifying surface tension of water, into jetting system container water before jetting the high pressure jet that comprises the water from the at least one jetting system container.

24. The system according to claim 14, wherein an angle between a jetting direction in which the jetting system is operable to jet the high pressure jet and a progression direction of the airplane does not exceed 5°.

25. The system according to claim 14, wherein an angle between a jetting direction in which the jetting system is operable to jet the high pressure jet and a progression direction of the airplane is between 80° and 100°.

26. The system according to claim 14, wherein the processor is further configured to determine a desired jetting direction in response to the result of the analysis, wherein a configuration of at least one nozzle is modified prior to the jetting of the high pressure jet in response to the desired jetting direction.

27. The system according to claim 14, wherein the processor is further configured to issue, following the analysis, an alert to an external airplane system indicating that a jetting by the jetting system occurred.

28. The system according to claim 14, wherein the processor is further configured to receive location information indicative of a location of the airplane and to selectively prevent triggering of the activation of the jetting system in response to the location information.

29. The system according to claim 14, wherein the processor is further configured to receive from an external system of the airplane environmental-condition-indicative-data that is indicative of at least one physical condition in an environment of the airplane, and to determine activation parameters for the jetting system in response to the environmental-condition-indicative-data.

30. The system according to claim 14, wherein the processor is further configured to determine activation parameters for multiple jetting instances of the jetting system.

31. The system according to claim 30, wherein the processor is further configured to determine the activation parameters for the multiple jetting instances in response to detection information that is received from the detector and which is indicative of detection of multiple birds at least partly concurrently.

32. The system according to claim 14, wherein the processor is configured to autonomously trigger the activation of the jetting system without receiving commands from any external system.

33. A program storage device readable by machine, tangibly embodying a program of instructions executable by the machine to perform a method for reducing damage to an airplane by birds comprising the steps of:
receiving detection information that was generated by a detector mounted on the airplane and which is indicative of motion of a bird detected by the detector in a vicinity of the airplane;
analyzing the detection information; and
selectively triggering jetting of a high pressure jet onto the bird by a jetting system that is mounted on the airplane, in response to a result of the analysis.

34. The program storage device according to claim 33, wherein the analyzing further comprises analyzing the detection information to determine an assessed potential of damage by the bird to an engine of the airplane.

35. The program storage device according to claim 33, further comprising issuing a command for modifying a state of a hydraulic connection between a fresh water supply of the airplane and at least one jetting system container of water that contains water used for the jetting onto the bird of the high pressure jet and which is hydraulically coupled to the fresh water supply of the airplane for at least a first period between a takeoff of the airplane to the triggering of the jetting system.

36. The program storage device according to claim 33, further comprising determining a desired jetting direction in response to the result of the analysis, and issuing a modification command instructing a jetting system component to modify a configuration of at least one nozzle prior to the jetting of the high pressure jet in response to the desired jetting direction.

37. The program storage device according to claim 33, further comprising determining activation parameters for multiple jetting instances of the jetting system.

38. The program storage device according to claim 37, further comprising determining the activation parameters for the multiple jetting instances in response to detection information that is received from the detector and which is indicative of detection of multiple birds at least partly concurrently.

* * * * *